(12) United States Patent
Gutwein et al.

(10) Patent No.: US 6,759,072 B1
(45) Date of Patent: Jul. 6, 2004

(54) METHODS AND SYSTEMS FOR UTILIZING DELAYED DILUTION, MIXING AND FILTRATION FOR PROVIDING CUSTOMIZED BEVERAGES ON DEMAND

(75) Inventors: Roger William Gutwein, Cincinnati, OH (US); Christopher Wade Connor, Cincinnati, OH (US)

(73) Assignee: The Procter + Gamble Co., Cincinnati, OH (US)

(*) Notice: Subject to any disclaimer, the term of this patent is extended or adjusted under 35 U.S.C. 154(b) by 0 days.

(21) Appl. No.: 09/638,704

(22) Filed: Aug. 14, 2000

Related U.S. Application Data

(60) Provisional application No. 60/148,984, filed on Aug. 14, 1999.

(51) Int. Cl.[7] .............................. A23F 5/00; A23F 3/34; A23L 1/20
(52) U.S. Cl. ..................... 426/433; 426/594; 426/429; 426/430; 426/431; 426/435; 426/590; 426/597; 426/432
(58) Field of Search ................................. 426/429, 431, 426/435, 597, 590, 432, 430, 433, 594

(56) References Cited

U.S. PATENT DOCUMENTS

| | | |
|---|---|---|
| 2,890,648 A | 6/1959 | King |
| 3,385,201 A | 5/1968 | Martin |
| 3,532,505 A | 10/1970 | Cornelius |
| 3,582,351 A | 6/1971 | Austin et al. |
| 3,607,280 A | 9/1971 | Durchholz |
| 3,619,205 A | 11/1971 | LeVan et al. |
| 3,634,107 A | 1/1972 | Cornelius |
| 3,641,918 A | 2/1972 | Schellgell et al. |
| 3,652,292 A | * 3/1972 | Bach et al. |
| 3,655,398 A | 4/1972 | Pitchon et al. |
| 3,854,389 A | 12/1974 | Hillemann |
| 3,944,677 A | 3/1976 | Katz |
| 3,987,211 A | 10/1976 | Dunn et al. |
| 4,039,693 A | 8/1977 | Adams et al. |

(List continued on next page.)

FOREIGN PATENT DOCUMENTS

| | | |
|---|---|---|
| CH | 650 140 A5 | 7/1982 |
| EP | 0 079 235 | 11/1982 |
| EP | 0 886 249 A1 | 10/1997 |
| EP | 0 893 065 A2 | 6/1998 |
| FR | 2 758 962 | 1/1997 |
| GB | 2 063 515 A | 10/1979 |

OTHER PUBLICATIONS

JP 9–198570 (translated version). Automatic Beverage Vending Machine. Inventors: Sakata et al. Japaneiese application published Jul. 31, 1997.*

*Primary Examiner*—Anthony Weier
(74) *Attorney, Agent, or Firm*—Theodore P. Cummings; Erich D. Hemm

(57) ABSTRACT

System for making and delivering a customized beverage product to a consumer having a user interface, a customization director in communication with a customization data store and the user interface, wherein the customization director includes executable instructions for determining a user's customized formulation; and a beverage delivery system in communication with the customization director, wherein the beverage delivery system includes executable instructions for delivering a customized beverage product. Method for delivering a customized beverage product to an individual including the steps of obtaining consumer preference data; determining a consumer beverage formulation corresponding to the consumer preference data; and providing the consumer a customized beverage corresponding to the customized beverage formulation, utilizing one or more of delayed dilution, delayed mixing, and delayed filtering, in any order.

19 Claims, 9 Drawing Sheets

U.S. PATENT DOCUMENTS

| | | |
|---|---|---|
| 4,064,795 A | 12/1977 | Ackerman |
| 4,088,794 A | 5/1978 | Katz et al. |
| 4,108,053 A | 8/1978 | Vink |
| 4,143,590 A | 3/1979 | Kasakoff |
| 4,147,097 A | 4/1979 | Gregg |
| 4,189,067 A | 2/1980 | Nottke et al. |
| 4,194,650 A | 3/1980 | Nottke et al. |
| 4,275,085 A | 6/1981 | Gregg |
| 4,277,509 A | 7/1981 | Wouda |
| 4,309,939 A | 1/1982 | Stover |
| 4,309,940 A | 1/1982 | Lowerre, Jr. |
| 4,316,916 A | 2/1982 | Adamer |
| 4,328,740 A | 5/1982 | McDonough et al. |
| 4,334,640 A | 6/1982 | van Overbruggen et al. |
| 4,366,262 A | 12/1982 | Covitch |
| 4,448,113 A | 5/1984 | Brabon |
| 4,470,999 A | 9/1984 | Carpiac |
| 4,493,249 A | 1/1985 | Stover |
| 4,532,142 A | 7/1985 | Dean |
| 4,550,651 A | 11/1985 | Haynes |
| 4,579,048 A | 4/1986 | Stover |
| 4,618,500 A | 10/1986 | Forquer |
| 4,621,571 A | 11/1986 | Roberts |
| 4,624,395 A | 11/1986 | Baron et al. |
| 4,649,809 A | 3/1987 | Kanezashi |
| 4,697,502 A | 10/1987 | English et al. |
| 4,701,333 A | 10/1987 | Margolis et al. |
| 4,708,263 A | 11/1987 | le Granse |
| 4,717,047 A | 1/1988 | Overbruggen et al. |
| 4,757,752 A | 7/1988 | Robins et al. |
| 4,790,239 A | 12/1988 | Hewitt |
| 4,791,860 A | 12/1988 | Verheijen |
| 4,797,293 A | 1/1989 | Evans et al. |
| 4,798,732 A | 1/1989 | Osawa |
| 4,809,594 A | 3/1989 | Vitous |
| 4,815,633 A * | 3/1989 | Kondo et al. |
| 4,830,869 A | 5/1989 | Wimmers et al. |
| 4,903,585 A | 2/1990 | Wimmers et al. |
| 4,911,067 A | 3/1990 | Oppermann |
| 4,919,041 A | 4/1990 | Miller |
| 4,920,871 A | 5/1990 | Anson et al. |
| 4,983,408 A | 1/1991 | Colton |
| 4,983,412 A | 1/1991 | Hauslein |
| 5,000,082 A | 3/1991 | Lassota |
| 5,025,714 A | 6/1991 | Brewer |
| 5,113,752 A | 5/1992 | Brewer |
| 5,114,047 A | 5/1992 | Baron et al. |
| 5,132,135 A | 7/1992 | Schweinfurth |
| 5,204,139 A | 4/1993 | Choi |
| 5,207,148 A | 5/1993 | Anderson et al. |
| 5,245,914 A | 9/1993 | Vitous |
| 5,249,509 A | 10/1993 | English |
| 5,323,691 A | 6/1994 | Reese et al. |
| 5,325,765 A | 7/1994 | Sylvan et al. |
| 5,353,692 A | 10/1994 | Reese et al. |
| 5,358,725 A | 10/1994 | Izumitani et al. |
| 5,384,143 A | 1/1995 | Koyama et al. |
| 5,427,806 A | 6/1995 | Ekanayake et al. |
| 5,431,940 A | 7/1995 | Calderas et al. |
| 5,476,033 A | 12/1995 | Locati |
| 5,579,678 A | 12/1996 | Goerndt |
| 5,584,229 A | 12/1996 | Anson |
| 5,619,901 A | 4/1997 | Reese et al. |
| 5,637,343 A | 6/1997 | Ryan, Jr. |
| 5,650,186 A | 7/1997 | Annoni et al. |
| 5,664,480 A | 9/1997 | DiFilippo |
| 5,665,415 A | 9/1997 | Kligerman et al. |
| 5,680,108 A | 10/1997 | Daniell et al. |
| 5,721,005 A | 2/1998 | Gutwein et al. |
| 5,724,882 A | 3/1998 | Gallas et al. |
| 5,724,883 A | 3/1998 | Usherovich |
| 5,733,591 A | 3/1998 | Goerndt |
| 5,740,719 A | 4/1998 | Triola et al. |
| 5,773,067 A | 6/1998 | Freychet et al. |
| 5,775,204 A | 7/1998 | Link et al. |
| 5,778,761 A | 7/1998 | Miller |
| 5,803,320 A | 9/1998 | Cutting et al. |
| 5,840,189 A | 11/1998 | Sylvan et al. |
| 6,055,513 A * | 4/2000 | Katz et al. |
| 6,177,093 B1 * | 1/2001 | Lombardi et al. |
| 6,203,837 B1 * | 3/2001 | Kalenian |

\* cited by examiner

METHODS AND SYSTEMS FOR UTILIZING DELAYED DILUTION, MIXING AND FILTRATION FOR PROVIDING CUSTOMIZED BEVERAGES ON DEMAND

CROSS REFERENCE TO RELATED APPLICATION

This application claims the benefit of priority to U.S. Provisional Application Serial No. 60/148,984, filed Aug. 14, 1999, which is herein incorporated by reference.

FIELD OF THE INVENTION

The present invention is directed to methods and systems to provide consumers (at home or away from home) quantities of ready-to-drink beverages, especially brewed coffee and tea and coffee and tea drinks (lattes, cappuccinos, chai teas, etc.). The consumer may customize a type of selection of beverage and various characteristics thereof, based upon his/her taste preferences; the serving of ready-to-drink beverage will be provided to the consumer.

More particularly, the present invention is directed to a system in which information is collected from a consumer regarding certain type, quantity, taste and strength preferences of the consumer. The information collected will be used to customize a suitable beverage product(s) for the individual consumer. The means for dilution of the beverage extract or concentrate may be linked to the information system so that an extract/concentrate (e.g., brewed) may be diluted according to a customized strength, thereby accommodate the consumer's strength preferences.

The "delayed dilution" aspects of the present invention may be used to accommodate the individual consumer's taste preferences by utilizing multiple varieties of specific types of beverage (e.g., more than one selection of coffee and/or tea), as well as different varieties or tea or coffee (roast strength, grind selection, plant and/or bean variety) in the brewing system. The "delayed dilution" aspects may also be used to deliver varieties of beverage options by using the undiluted concentrate/extract to mix/dissolve other beverage compounds or flavors to make chai-teas, cappuccinos, lattes, etc., with minimal dilution to the final beverage. The "delayed mixing" aspect of the present invention may be utilized to accommodate consumers' taste preferences by taking separated selected extractions of the brew and diluting appropriate fraction(s) in accordance with the consumer's preferences. The "delayed filtering" aspects of the present invention may be utilized to accommodate various consumer preferences by offering variations in processing that would impact various aspects of body and character to accommodate a wide range of consumer taste preferences.

By providing a high volume system for making ready-to-drink beverages and dispensing successive individually customized servings thereof, the invention is particularly desirable in the restaurant, (especially fast food) environments, as well commercial and industrial settings (office buildings, workplaces, hospitals, and the like, with large waiting areas This invention may also be used in household environments where it may be desirable to make several different types of finished beverage products tailored to the taste preferences of several household members. Because these many variations may be made from earlier, initial brew(s), the variations of the same type of beverage (e.g., coffee vs. tea) can be provided immediately upon each individual selection.

BACKGROUND OF THE INVENTION

Much study has been given to the most satisfactory way to brew beverages such as coffee and tea and it is a fact that an excellent grade of coffee or tea can be effectively ruined for consumption by improper methods of preparation of the ready-to-drink product. In general, a high quality and most satisfying coffee or tea drink is obtained only when it possesses fine characteristic aroma, delicacy of characteristic flavor, and fullness of characteristic body.

Also importantly, many consumers have come to appreciate the many various options available with respect to coffee and tea products (e.g., variations in strength, varietal type, creaminess, flavors) and there are a wide variety of coffee options (lattes, espressos, cappuccinos, etc.) and tea options (regular tea, creamy tea, chai-tea and green teas). However, especially in a commercial/industrial setting (e.g., restaurant, fast-food industry, workplace, hospitals), there are many hurdles (e.g., space, difficulty, time, and/or inconvenience) to be overcome in delivering, especially on demand, the preferred choice of beverage to a wide range of consumers.

Additionally, most individual households comprise family members with various taste preferences: heretofore, it has been, at best, cumbersome and bothersome to address individual preferences, and would require many different brewing cycles and many different receptacles to accommodate mixing of different fractions and types. It would be desirable to employ one (or at least a minimal number of) extracts in a single countertop station to efficiently accommodate various taste preferences, on demand, in a household environment.

One particularly preferred aspect of the present invention is coffee beverages. Coffee beverages comprise an aqueous solution of the water-soluble (and sometimes insoluble) constituents of the roasted and ground beans of the tree of the family Rubiaciae. There are many varieties of this plant, but the two having the most significance commercially is *Caffee arabica* and *Caffea canephora* (robusta).

Equipment for brewing beverages such as coffee, tea, and the like have typically been of the "single station" type, in which an empty carafe or pot is positioned on a heating element below a receptacle or brewing funnel which contains a measured quantity of dry beverage-making material, e.g. roast and ground coffee or tea leaves. Hot water is then passed through the material to extract the essential oils, flavor and body that make up the beverage, and then drains downwardly through an opening in the funnel into the pot or carafe. If and when a second pot or carafe of beverage is needed, the first must be moved to a separate heating element or plate.

Although such prior beverage brewers work satisfactorily for making relatively small quantities of beverages, in restaurants and other commercial and institutional establishments, there is a continuing need for equipment to make large quantities of brewed beverage, but be able to instantaneously accommodate the taste preferences of a wide variety of consumers; furthermore, this equipment must be easy to use and relatively automatic so as not to require an unreasonable amount of personal attention during the brewing cycle. The needs of restaurants, institutions and other commercial establishments are of particular concern in regard to equipment for brewing and making an acceptable cup of coffee to an individual consumer, given the limitations of space, labor, and time.

Some currently available beverage brewing devices provide essentially instantaneous hot water to brew beverages in a short amount of time. These devices typically have a hot water reservoir which maintains a volume of water at a predetermined temperature. A cold water fill tube is attached inside the reservoir, with one end close to, but not abutting, the bottom of the hot water reservoir, of a separate cold water reservoir or basin positioned above the heated reservoir. A hot water discharge tube has one end positioned in the hot water reservoir near an outlet zone generally at the top of the hot water reservoir. Another end of the discharge tube delivers hot water transported through the tube to a beverage brewing substance in order to produce a brewed beverage concentrate.

In order to brew a beverage in a beverage brewing device as described above, cold water is poured into the basin. The cold water flows through the cold water fill tube and accumulates at the bottom of the hot water reservoir due to temperature variations between the cold and hot water. The hot water is displaced by the cold water and moves upwardly towards the top of the hot water reservoir, which is sealed by a cover, and through the hot water discharge tube. Upon being dispensed into a beverage brewing substance, the hot water and beverage brewing substance create a brewed beverage concentrate. (For examples of representative instantaneous hot water beverage brewing apparati, see U.S. Pat. No. 3,385,201 to Martin, U.S. Pat. No. 4,920,871 to Anson, and U.S. Pat. No. 5,025,714 and U.S. Pat. No. 5,113,752, both to Brewer.)

Dilution of the brewed extract/concentrate is necessary in order to prevent the brewed extract/concentrate from being too strong as well as preventing an additional manual step of diluting the extract/concentrate after it has been brewed. Dilution of the brewed concentrate is achieved by feeding water from the basin to either the brewing funnel and allowing it to pass through the grounds/leaves or the area between the inner brewing funnel and the outer brewing funnel.

It is generally desirable to provide equipment which requires minimum maintenance by the employees. It is preferable to provide equipment which will make a sufficient volume of brew to meet the customer demands without over-producing, but in adequate quantities which can be replenished within a reasonable time with minimum attention by the employees. Additionally, and desirably, the equipment should usually be compact.

It is, therefore, desirable to provide a beverage-brewing system which will allow a consumer to customize their preferred variety of beverages from a virtually endless selection of possibilities; the system of the present invention will provide an individually customized serving of beverage delivered at the desired temperature and ready to drink.

SUMMARY OF THE INVENTION

Accordingly, it is a general object of the present invention to provide an improved system for providing an individually customized brewed ready-to-drink beverages to a consumer, in a wide range of types, varieties, and/or strengths.

It is a further object of the present invention to provide a brewing system for making varieties of brewed beverages, in particular variety, body, character and/or strengths as chosen by multiple individual consumers with the system being easy to use, by the consumer or other individual (e.g., restaurant wait staff) obtaining the customized beverage. Further, the maintenance of the subject equipment requires only a small amount of personal attention by the owner/operator of the equipment.

A general object of the present invention is to utilize "delayed dilution" of a concentrate extract to provide a beverage brewing system which immediately (upon customer selection) provides selective dilution (based on individual consumer's selections) of a beverage extract after the extract has been allowed to brew and held as an extract before dilution.

It is also a general object of the present invention to utilize the undiluted extract to mix and dissolve other beverage compounds to make flavored coffees and teas, cappuccinos, lattes, creamy coffees and teas, chai teas, green teas, and the like.

It is also a general object of the present invention to utilize aspects of "delayed mixing" and/or "delayed filtering" to accommodate various consumer preferences regarding body character and consistency of the finished beverage, especially coffee-type beverages.

It is also a general object of the present invention to provide a brewed beverage delivery system which allows a consumer to select from various classifications of beverages and customize said selection according to that consumer's preferences.

One aspect of the present is the method for delivering an individually customized beverage product to a consumer. An exemplary method comprises the steps of obtaining consumer preference data from the consumer; determining a beverage formulation corresponding to the consumer preference data; and providing the consumer a customized beverage product corresponding to the beverage formulation.

Another aspect of the present invention is the interactive system for delivering a customized beverage product to a consumer. In one example, the system comprises a user interface; a customization director in communication with a customization data store, wherein the customization director comprises executable instructions for determining a user's customized formulation, and a beverage delivery system in communication with the customization director comprising executable instructions for delivering a customized beverage product.

Yet another aspect is a computer-readable medium containing instructions for controlling a beverage delivery system to produce a customized beverage product. In one embodiment, the instructions comprise the steps of: obtaining consumer preference data; determining a consumer beverage formulation corresponding to the consumer preference data; and providing the consumer a customized beverage corresponding to the consumer beverage formulation.

Still other objects, advantages and novel features of the present invention will become apparent to those skilled in the art from the following detailed description, which is simply, by way of illustration, various modes contemplated for carrying out the invention. As will be realized, the invention is capable of other different obvious aspects all without departing from the invention. Accordingly, the drawings and descriptions are illustrative in nature and not restrictive.

These and other objects of the present invention are set forth more clearly and fully in the following detailed description of two preferred embodiments of the present invention shown and described in connection with the attached drawings, in which:

BRIEF DESCRIPTION OF THE DRAWINGS

While the specification concludes with claims particularly pointing out and distinctly claiming the present invention, it is believed that the same will be understand from the following description taken in conjunction with the accompanying drawings in which:

Figure 1:
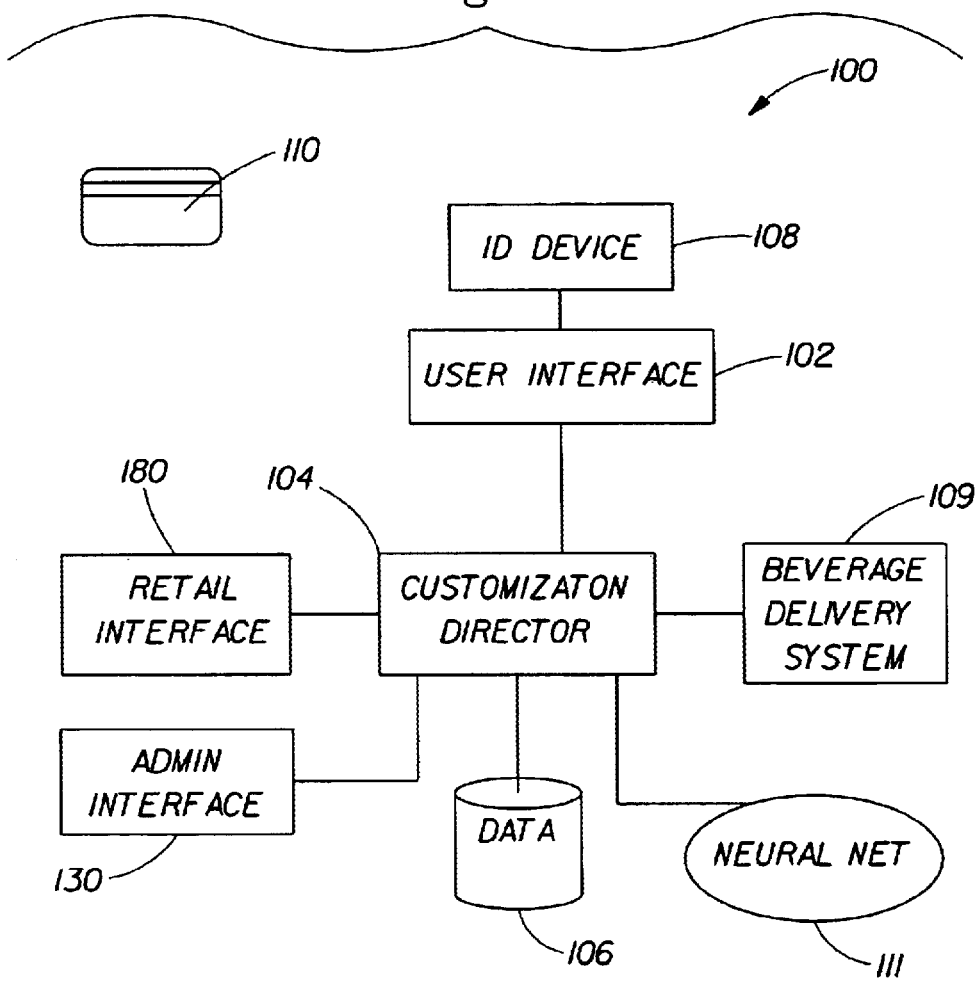
FIG. 1 is a schematic illustration of an exemplary interactive system for conducting business according to the present invention.

The components of system 100 are each connected by a network 507 by network connector 509. Network connector 509 may be any network connector known in the art including, but not limited to, token ring, Ethernet, telephone line, fiber optic, cellular, coaxial cable, universal serial bus, parallel cable, serial cable, IEEE 1394 Firewire, Bluetooth, infrared (IR), radio frequency (RF), laser, and the like, or combinations thereof. Network connector 509 is connected to the various components via a network connection device 508. The network connection device includes, but is not limited to, telephone modems, cable modems, DSL modems, peripheral ports (e.g., serial, parallel, USB, IR), and the like and combinations thereof. Network 507 may be a peer-to-peer network, a client-server network, the Internet, an intranet, and the like, or combinations thereof.

In one embodiment of the present invention both the away from home system 502 and the at home system 504 comprises a customization director 104, a beverage delivery system 109, a data display device 510, a data input device 512, a data storage device 106, and network connection device 508. It will be appreciated by those skilled in the art that both the data display device 510 and the data input device 512 may be the same device (as in the case of a touch screen) or may be separate devices (e.g. a keyboard and an LCD display screen). It will also be appreciated that the data input and display devices (512 and 510) can be any such device known or used in the art including, but not limited to those that work by sight, sound, magnetism, light, electrical signal, and the like or combinations thereof. The customization director 104 is connected to the network and other components of system 100 via the network connection device 508. The customization director 104 is also connected to the data input device 512, data display device 510, the beverage delivery system 109 and the data storage device 106. The data storage device 106 may be comprised of one or more data storage devices of those commonly known and used in the art. The data storage device 106 may contain data of beverage formulations, user identification, user preferences, and the like.

Remote programming station 506 is connected to network 507 via a network connection device 508, which is in turn connected to customization director 104, a data display device 510, a data input device 512, and a data storage device 106. The remote programming station 506 may be a stand alone, dedicated computer device, such as a work station. Alternatively, station 506 may be the combination of a generic computer device running a software program that allows the user to create a customized beverage formula and store the information on data storage device 106. Suitable programs could be constructed using such programming languages java, cgi script, html, xtml, shtml, and the like.

Figure 5:
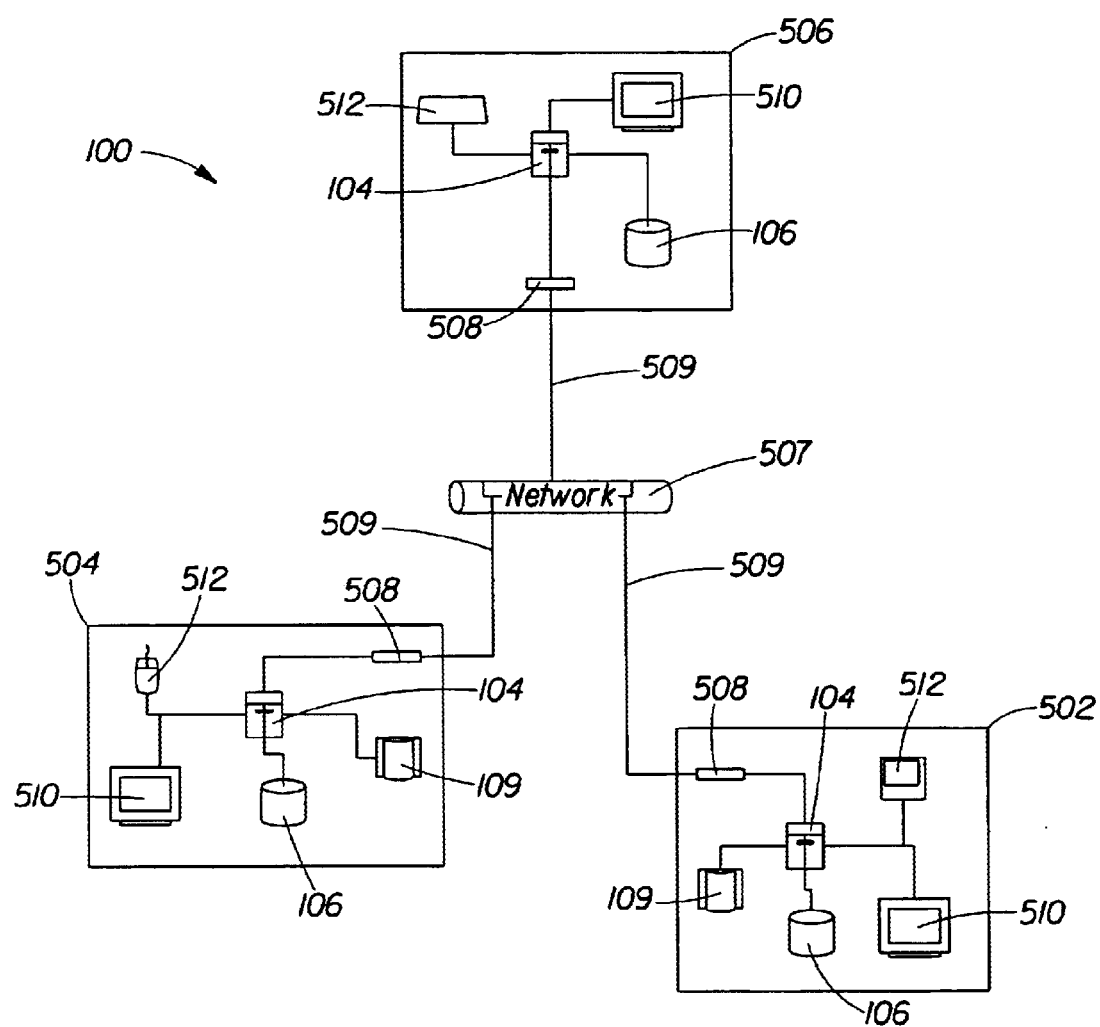
FIG. 5 represents another embodiment of the present invention wherein various components of the customizable beverages delivery system 100 are located and/or replicated at different physical locations. System 100 comprises one or more away from home customizable beverage delivery systems 502, one or more home customizable beverage delivery systems 504, and one or more remote beverage programming stations 506. The away from home systems 502 may be located in restaurants, at work, in convenience or grocery stores, and the like. The remote programming stations 506 may be located either at the same physical location as the at home system 504 and away from home system 502, or at another, remote physical location.

It will be appreciated that with respect to system 100 as represented in FIG. 5 it is within the skill of those in the art to design and build systems that share system resources and reduce the redundancy of system components. In such systems, for example, network 507 could employ a single data storage device 106 that may, or may not, be located in physical proximity to the system component at which the user is currently located. Additionally, system 100 could employ a single data director 104 to which all devices are connected to over network 507.

Figure 6:
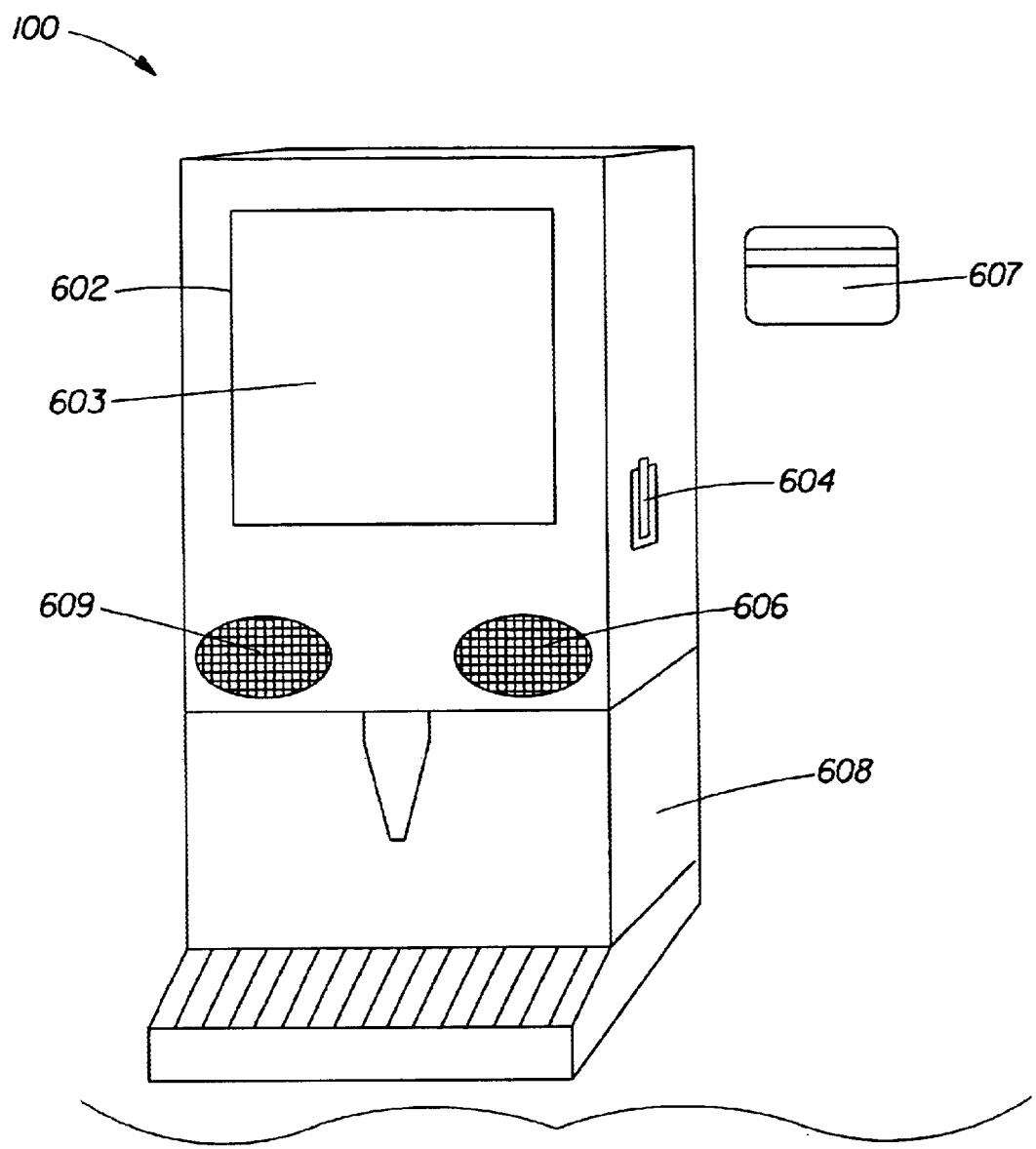

Another embodiment of the present invention is represented by FIG. 6 and described in detail below. The customizable beverage system 100 is contained within housing 608. A touch screen display 602 located within housing 608 serves as both the input device for the collection of data from the system user and the output device for displaying information relating to the user's beverage selection. Touch screen 602 displays a series of Graphical user Interfaces (GUI) 603 which serve to facilitate the collection and display of information between the user and the customized beverage system 100. Information may also be collected electronically by system 100 through the use of a card reader 604 which reads information stored on identification card 607. For system users' who are visually impaired, or simply to further facilitate the exchange of information, microphone 606 can be utilized to input vertical commands to system 100 and speaker 609 can be utilized to communicate choices and other information to the user. Verbal commands via microphone 606 would be translated using speech recognition software into instructions that could be interpreted by customization director 104 (not shown).

With reference to the presently described embodiment the user would approach system 100 and be presented with a standard welcome GUI 603. The information displayed on the standard welcome GUI could be either static, dynamic, or mixtures thereof. In one embodiment of the present invention the standard welcome GUI 603 displays current news, weather and sports information, in addition to information describing the types of customizable beverages system 100 can provide. System use instructions may also be displayed on the standard welcome GUI 603.

The user then activates System 100 by either touching touch-screen 602 displaying the standard welcome GUI 603, inserting the user's identification card 607 into card reader 604, or alternatively vocalizing a session start command that would be picked-up by microphone 606. Following system activation, system 100 alters the display on touch-screen display 602 from the standard welcome GUI 603 to the beverage selection GUI 700.

Figure 7:
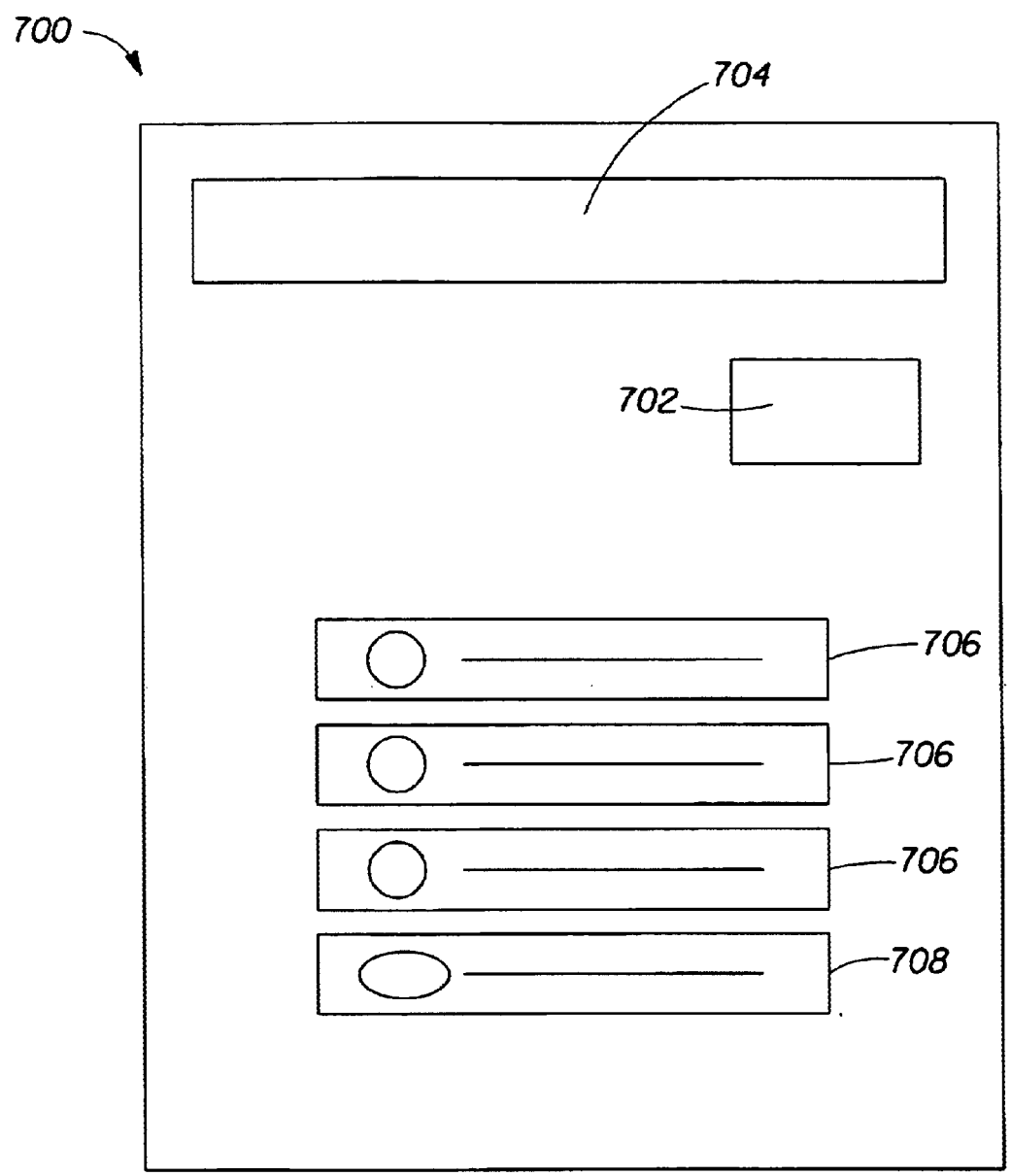

FIG. 7 shows the beverage selection GUI 700. Beverage selection GUI 700 contains a personalized greeting area 702 which displays information referring to the current user. This information could include the user's name, account information such as remaining balance, beverage selection suggestions based on previous consumption patterns and/or predicted beverage choice desires, and the like. Beverage selection GUI 700 also contains additional data display area 704 which can display a variety of information that may or may not be associated with the current user. For example, additional data display area 704 could display an update of user's financial portfolio, e-mail account information (i.e., new message status, message sender, subject, or alternatively the entire message), weather updates, news headlines, sports scores, and the like. The exact information content displayed may be selected by the user, by system 100 based on previous and/or current experience with the user (e.g. demographic criteria, beverage selection, and the like), or a combination of the two. Additional data display area 704 may also display advertisements and other promotional information.

Beverage selection GUI 700 also contains predetermined beverage selection icons and labels 708 which correspond to standard beverage formulations. These standard beverage formulations may be displayed for every user, regardless of the time of activation, or may be alternated by system 100 depending on the time of day, season, weather, and the like. Alternatively, the predetermined beverage selection icons and labels 708 may correspond to beverage formulations saved by the current user, for example, the current user's favorite afternoon beverage choice. The saved beverage formulation may be located on and accessed from the user identification card, may be stored in a local data storage device, or may be located on a remote data storage device that is accessed by system 100. Beverage selection GUI 700 also displays a customization option icon and label 708 which when selected by the user will initiate activation and display of the customization GUI 800.

Figure 8:
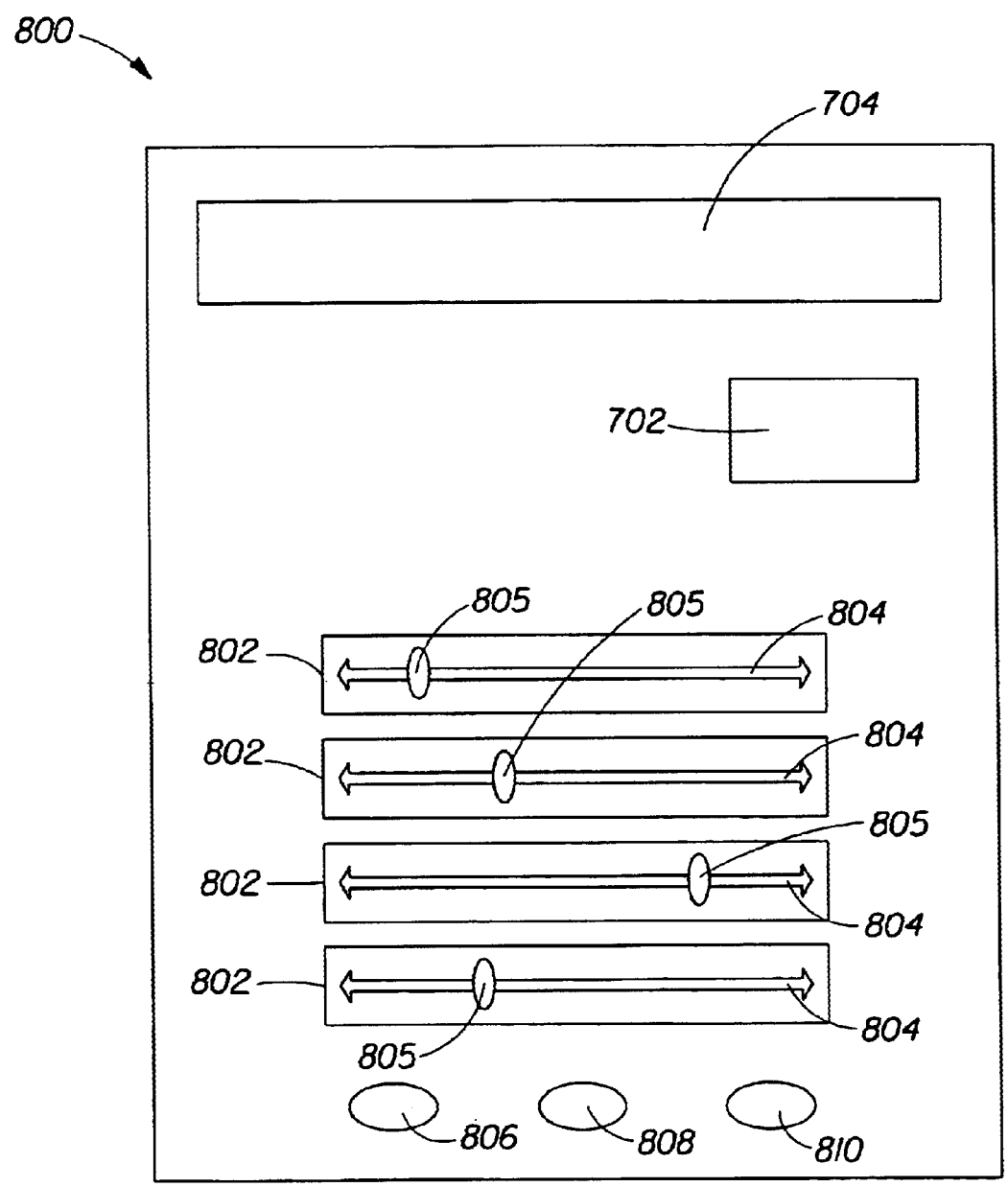

FIG. 8 details a beverage customization GUI 800 which display information corresponding to the design of a customized beverage. The beverage customization GUI 800 may optionally contain personalized greeting area 702 and/or additional data display area 704. Principally, the beverage customization GUI 800 displays one or more customizable beverage characteristic indicators 802 which correspond to a given beverage characteristic which system 100 can adjust in conformity with the indicated preference of the system user. Customizable beverage characteristic indicators 802 comprises a customizable beverage characteristic scale 804 which conveys the total degree of variability possible with the given customizable beverage characteristic (i.e., roast color, beverage strength, beverage temperature, additional flavors, and the like), and customizable beverage characteristic position marker 805 which corresponds to the current level of customizable beverage characteristic on the customizable beverage characteristic scale 804. The system user would, in the case of a touch-screen, touch that portion of the customizable beverage characteristic scale 804 that represents the desired level of the given customizable beverage characteristic. The beverage customization GUI 800 would then update such that the customizable beverage characteristic indicator 802 would reflect the user's preference by displaying the customizable beverage characteristic position marker 805 over the appropriate portion of the customizable beverage characteristic scale 804. When the user has finished formulating a customized beverage the user may either save the customized beverage formulation via selection of the save icon 806, or the user may have system 100 dispense the beverage via selection of the dispensing icon 808. Upon selection of the save icon 806 system 100 may transfer the programmed beverage formulation to any device capable of storing the customized beverage information. Optionally, the user may return to a previous GUI through selection of the return icon 810 which will prompt the system to display a previous GUI, such as the beverage selection GUI 700.

Figure 9:
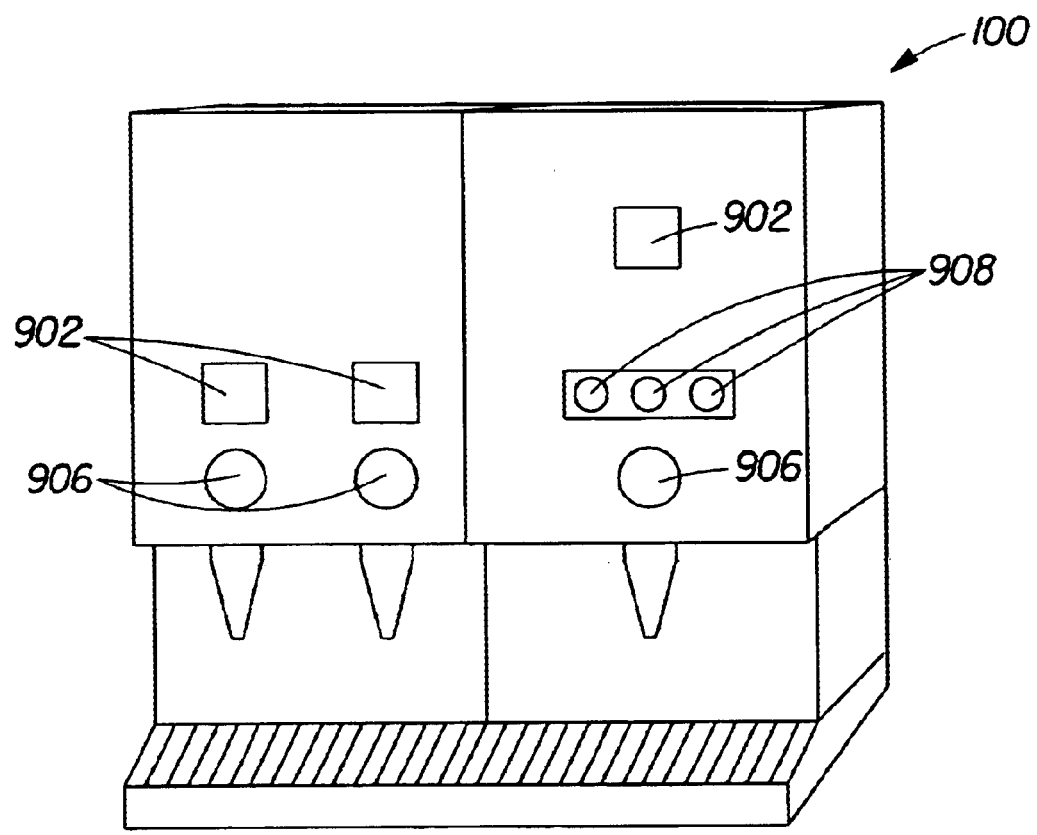

Another embodiment of the present invention is detailed in FIG. 9 and the corresponding description below. System 100 is capable of dispensing both customized beverages and beverages with predetermined, non-customizable formulations. The beverage variety is indicated by the beverage variety indicator icon 902, which displays information pertaining to a given beverage choice. If a given beverage variety indicator icon 902 corresponds to a beverage choice that is customizable then one or more customizable beverage characteristic indicators 802 will be located in close proximity such that the user may customize the beverage. In one embodiment of the present invention the customizable beverage characteristic indicator 802 comprises two or more discrete customizable beverage characteristic indicators 908 which correspond to a customizable beverage characteristic (i.e., roast color, beverage strength, beverage temperature, additional flavors, and the like). System 100 also allows the user to select a non-customizable beverage. Once the user has selected the desired beverage, and customized the beverage if the desired beverage choice corresponds to a customizable beverage, the beverage may be dispensed via depression of dispense button 906.

DETAILED DESCRIPTION OF THE INVENTION

Reference will now be made in detail to various embodiments of the invention, various examples of which are illustrated in the accompanying drawings, wherein the numerals indicate corresponding elements throughout the views.

The present invention is directed to a system for the individual customization of ready to drink brewed beverage products for multiple consumers, as well as the provision of the customized ready to drink beverages after consumer input. The method of the present invention comprises three basic steps: collecting information from a consumer regarding the consumer's desires as to the type and character of beverage he/she desires at that point in consumption; a system linking the consumer's choice of product to a beverage delivery system which contains an amount of extract/concentrate and areas in the beverage delivery system(s) to accommodate, if desired, one or more aspects of delayed dilution, mixing and filtration. The system of the present invention may optionally utilize (any or all) the aspects of delayed dilution, "delayed mixing" and "delayed filtration" to further increase the options of beverage deliverable, on demand, to the individual consumer based upon their preferences.

A. Definition

As used herein the terms "brewed beverage products" and "fresh-brewed beverage products" refers to coffees and teas.

As used herein, the terms "extract" and "concentrate" are used interchangeably, unless where otherwise specified. Within the context of the present invention—providing individually customized beverages on demand to consumer—it does not matter whether an extract or concentrate is used. "Fresh brewed" extracts are certainly acceptable, but are not required. In one embodiment, the roast and ground coffee is contained in pods or sachets that are inserted into the brewing chamber. An example of this type of pod is the "K-Cup", manufactured by Keurig, Inc. and disclosed in U.S. Pat. Nos. 5,325,765 and 5,840,189, hereby incorporated by reference herein.

Additional varieties of beverage products may be made but when the "customized variety-on-demand" aspects of the present invention are used (delayed dilution, delayed mixing and/or delayed filtration), a customized beverage product can be delivered, that used either extracts or concentrates as starting material. The terms "extract," "concentrate," "extract/concentrate," and "concentrate/extract" includes "brews," concentrates, "toddies," infusions, and the like.

The term "fresh-brewed" as used herein refers to beverage concentrates/extracts which have been extracted and held for a "hold-time" and no more than about 48 hours.

As used herein, "coffee beverages" include cappuccinos, espressos, lattes, flavored coffee beverages, creamy coffee beverages, and other coffee-based beverages which are derivatives and/or variants of the above.

As used herein "tea beverages" include tea, green teas, herbal teas, flavored tea, chai teas, and creamy teas, and other tea-based beverages which are derivatives and/or variants of the above.

As used herein the terms "ready-to-serve beverage" and "ready-to-drink beverage" are used interchangeably to refer to beverage products that are in a ready-to-use, consumable form, and other coffee and/or tea-based beverages which are derivatives and/or variants of the above. They are made from coffee extracts or tea extracts and can also include dry mixes, powders, liquids, extracts, concentrates, and emulsions, in a wide variety of formulations.

The term "beverage type" as used herein means coffee or tea.

The term "classifications" as used herein means characteristics or attributes of certain types of beverages and include temperature, strength, body (full or light), roast (color or degree), acidity, sweetness, bitterness, and/or mouthfeel.

The term "variety" means country of origin (grown) and/or specific grown region (e.g., varietal), including harvesting and post-harvesting techniques within a given species or a species within a genus. The fineness of the grind exerts an influence on the (quality) flavor as well as the degree of extraction (quantity). Coffee beans useful in the present invention can be either of a single type or grade of bean or can be formed from blends of various bean types or grades, and can be undecaffeinated or decaffeinated. These high-grown-type beans are typically referred to as high grade coffees. Suitable high grade coffee having high acidity include Arabicas and Colombians characterized as having "excellent body," "acid," "fragrant," "aromatic" and occasionally "chocolatey." Examples of typical high quality coffees are "Milds" often referred to as high grade Arabicas, and include among others Colombians, Mexicans, and other washed Milds such as strictly hard bean Costa Rica, Kenyas A and B, and strictly hard bean Guatamalans.

The term "hold-time" means that period of time beginning with the onset of brewing of the extract and ending when dispensed to the consumer.

As used herein, the term "comprising" means that the various coffees, other ingredients, or steps, can be conjointly employed in practicing the present invention. Accordingly, the term "comprising" encompasses the more restrictive terms "consisting essentially of" and "consisting of."

All ratios and percentages herein are based on weight unless otherwise specified.

B. Making the Beverage Extract/Concentrate

Almost universally, the extract is brewed by contacting the roasted and ground coffee with hot water at a temperature from moderately-below boiling to moderately-above boiling, for a predetermined brewing time, separating the extract (including the solutes) from the insolubles, and consuming the resulting beverage.

Brewing methods can generally be categorized in three broad groups: (1) single-pass infusions in which the water is percolated or pumped through the roasted and ground coffee (which may partially serve as its own filter) then filtered through a metal, paper, or cloth sieve; (2) percolation methods which recycle the extract through one or more volumes of grind consecutively, in either a co-current or counter-current flow, before the extract is siphoned off at the requisite strength; and (3) batch-slurry methods in which a fixed volume of coffee is mixed with a fixed volume of water in a brewing vessel, permitted to steep with or without agitation, then filtered or mechanically separated to produce the extract.

Systems providing brewed beverages, especially coffee or tea, have typically been of the "single station" type, in which an empty carafe or pot is positioned on a heating element below a receptacle or brewing funnel which contains a measured quantity of dry beverage-making material, e.g. ground coffee or tea leaves. Hot water is then passed through the material to extract the essential oils, flavor and body that make up the beverage, and then drains downwardly through an opening in the funnel into the pot or carafe. If and when a second pot or carafe of beverage is needed, the first must be moved to a separate heating element or plate. Although such prior beverage brewers work satisfactorily for making relatively small quantities of beverage, in restaurants and other commercial and institutional establishments, there is a continuing need for equipment to make large quantities of beverages which is easy to use and relatively automatic so as not to require an unreasonable amount of personal attention during the brewing cycle.

A suitable method for brewing a tea extract useful in the system of the present invention is disclosed in U.S. Pat. No. 4,757,752 to Robbins (assigned to General Foods Corp.), issued Jun. 19, 1988, and is hereby incorporated by reference.

Any extract/concentrate which is generally available can be used in the practice of the system of the present invention. In one embodiment, the roast and ground coffee is contained in pods or sachets that are inserted into the brewing chamber. An example of this type of pod is the "K-Cup", manufactured by Keurig, Inc. and disclosed in U.S. Pat. Nos. 5,325,765 and 5,840,189, hereby incorporated by reference herein.

A particularly preferred method of providing brewed beverages is to provide an extract and combine it with the "delayed dilution" aspect of the system of the present invention. Either or both of the "delayed mixing" or "delayed filtering" aspects of the present invention can be combined with said particularly preferred mode.

Within several embodiments of the present invention have been illustrated and described, it is not intended to thereby limit the present invention. Rather, it will be obvious to those skilled in the art that various changes and modifications can be made without departing from the spirit and scope of the invention. It is intended, therefore, to cover in the appended claims all such changes and modifications that are within the scope of this invention.

The system of the present invention preferably offers customization of a brewed beverage based upon consumer selection. This is optionally provided by utilization of delayed dilution, delayed mixing, or delayed filtering (one, two or all three, in any order) of a beverage extract.

C. Delayed Dilution

As used herein, the term "delayed dilution" refers to the aspect of holding the brewed (preferably fresh brewed) beverage (preferably coffee) extract for a minimum period of about 5 minutes, preferably of about 15 minutes, more preferably of about 30 minutes. In a preferred mode, "delayed dilution" also refers to the aspect of holding the extract for a maximum period of time of about 48 hours, preferably of about 24 hours, more preferably of about 12 hours, most preferably of about 6 hours.

On particularly preferred embodiment involves the use of fresh brewed coffee extracts. In this embodiment, the fresh brewed extract produced by the process of the present invention has a brew solids of less than about 10%, preferably less than about 5%, more preferably less than about 4%, most preferably less than about 3.5%. In a particularly preferred embodiment of the process of the present invention, the extract has a minimum brew solids of greater than about 1.2%, preferably greater than about 1.5%, most preferably greater than about 2%.

It is important to recognize that a key aspect of one of the embodiments of the present invention allows customization of the preferred coffee just prior to dispensing; there is no predetermination of characters or strength as is seen with many automated systems. The "delayed dilution" aspect allows, multiple servings of individually tailored coffee to be prepared from a minimum number of brew cycle(s), preferably one. Additionally, these individually tailored servings are dispensed on demand.

When coffee extracts are used, it is preferred that said dilution ratios will be from about zero (no dilution) to about 1:15 coffee/water, and can be easily varied, utilizing currently available methods, upon receiving the consumer's selection input regarding strength. Also, the temperature of the dilution water may be varied to accommodate individual consumer preferences around consumption temperature; there are several ways that this could readily be accomplished, but one preferred way would be to have two dilution lines; one for hot (170–200° F.) and one for cold (40–80° F.) water and coordinate their rate and flow to deliver the coffee to each individual consumer at their preferred temperature.

In the practice of one of the preferred embodiments of the present invention, the weight ratio of the extraction portion of water to dry, roast and ground coffee is from about 5:1 to about 24:1; preferably from about 8:1 to about 13:1. When this amount of water is used for (drip) extraction, a relatively strong (meaning concentrated but not bitter) filtered coffee extract is issued. Normally, this extract will have a soluble solids content by weight of greater than about 1.2%, preferably 1.5%. The relatively strong filtered coffee extract is then diluted with a sufficient amount of dilution water to a preferred beverage concentration.

It is important to recognize that a key aspect of a preferred embodiment of the present invention allows selection of the preferred beverage type and classification just prior to dispensing: there is no predetermination of characters or strength as is seen with many automated systems. The "delayed dilution" aspect allows multiple servings of the same beverage type in individually tailored beverages to be prepared from a minimum number of brew cycles, preferably one. Additionally, these individually tailored servings may be dispensed, if desired, on demand.

Clearly, this aspect of the system of the present invention imparts many benefits to the extract that result in a better final beverage for the consumer. For instance, delaying dilution of the extracted beverage removes the need to hold the beverage in a "consumption-ready," i.e., "ready-to-drink", state (e.g., diluted and at the preferred temperature). In the undiluted state, the beverage, particularly coffee, has less water and degrades at a slower rate. Additionally, the need to heat or cool during holding is minimized.

Further, the undiluted extract takes up less space and can be more easily surged in a given physical geometry.

Employing the "delayed dilution" aspect of this present invention results in many benefits to the finished beverage; this ultimately results in less "too old" or "stale" beverage being served. In a particularly preferred embodiment of the present invention, the brewed extract may be cooled or refrigerated. It will be recognized by those skilled in the art that cooling or refrigerating the extract or concentrate will further increase maximum hold times that can still maintain desirable flavor attributes.

D. Delayed Mixing

In another aspect of the present invention, the beverage extract/concentrate can be automatically fractionated previous to initial, or a subsequent (if any) dilution. By mixing various fractions of the extract, the character and body of the resulting beverage can be changed. For example, in coffee, the early fraction will be more acid, "high grown" and less ashy and dirty. The later fractions will be less acid and stronger in bitter ashy dirty flavors. To accommodate various consumer preferences, the coffee beverages could be made from the earlier extract alone, the latter extract alone, or a mix of fractions in various ratios. The potential variety created could cover "high grown" to "low" coffees and could also cover some of the aspects character and body resulting from a degree of roasting.

As used herein, the term "delayed mixing" refers to the aspect of holding the brewed (preferably fresh brewed) beverage (preferably coffee) extract for a minimum period of about 5 minutes, preferably of about 15 minutes, more preferably of about 30 minutes. In a preferred mode, "delayed mixing" also refers to the aspect of holding the extract for a maximum period of time of about 48 hours, preferably of about 24 hours, more preferably of about 12 hours, most preferably of about 6 hours.

It is recognized that novel beverage products could be prepared using this aspect of the present invention. Clearly, some substances that result in character and body appear in initial fractions only (or appear in initial fractions and disappear upon continued heating) while other such substances appear in later fractions only. By mixing fractions and, further, by mixing them in various ratios, a multitude of beverage types can be prepared which have heretofore been unavailable using standard brewing equipment and practices.

E. Delayed Filtering

The "delayed filtering" aspect of the present invention would allow the beverage extract/concentrate to stay in contact with the coffee grounds or tea leaves during holding of the extract. While not wanting to be limited by theory, it is believed that the grounds or leaves would help absorb the reaction compounds during extract storage and would also buffer the acids created during storage. Filtering could also be customized at dispensing, e.g., metal filter vs. paper filter, and could also be in stages (e.g., coarse metal mesh, followed by dilution, and then paper filtering).

As used herein, the term "delayed filtering" refers to the aspect of holding the brewed (preferably fresh brewed) beverage (preferably coffee) extract for a minimum period of about 5 minutes, preferably of about 15 minutes, more preferably of about 30 minutes. In a preferred mode, "delayed dilution" also refers to the aspect of holding the extract for a maximum period of time of about 48 hours, preferably of about 24 hours, more preferably of about 12 hours, most preferably of about 6 hours.

F. Customization Interface

1. System Interface

Because of the potential purchase cost, personal time investment, and fear of negative experience, consumers may find experimentation or the "trial-and-error" associated with finding their most desired type of beverage product to be unacceptable or unpleasant. Many consumers do not understand how the various options available with respect to beverage products corresponds to their own individualized taste preferences. Further complicating this situation is that, in a given location, literally dozens of options with respect to beverage products might be available for consumption.

It is, therefore, desirable to provide a method which will allow a consumer to identify one or more beverage products which that consumer has a statistically greater change of accepting and enjoying from a taste preference standpoint than other available beverage products. Ideally, such a system should be simple to learn and use.

The method of the present invention comprises three basic steps: collecting information from a consumer regarding the consumer's desires as to the variety of beverage they desire at that point in consumption; a process linking the consumer's choice of beverage product to a holding area which contains an amount of brewed extract; and an area where the dilution of the beverage occurs at a ratio of water to brewed beverage extract that is consistent with the consumer's choice as to brew strength and variety. The system of the present invention may optionally utilize (either or both) the aspects of "delayed mixing" and "delayed filtration" to further increase the options of "brewed" beverage deliverable, on demand, to the individual consumer based upon their preferences.

2. Definitions

The term "variety creating systems/devices" as used herein refers to devices and processes that can transform one or more input materials into multiple varieties of beverages. Such systems and devices including delayed dilution means/systems, delayed filtering means/systems, and/or delayed filtration means/systems.

The term "customization interface", as used herein, refers to the non-human vehicle which transmits the information (e.g. consumer information, customization information, and customization recommendation) between the consumer and the beverage delivery system. This interface can be embodied in many ways, and the consumer may access the customization interface from a remote location.

The term "beverage delivery system" as used herein refers to the station, apparatus, device, equipment, or series thereof that is linked with the customization interface and is, optionally, equipped with "variety creating systems/devices" including delayed dilution means/systems; delayed mixing means/systems, and/or delayed filtration means/systems.

The term "customized selection identification" as used herein refers to the process in which, and the means by which, the customization interface or the beverage delivery system recognizes the consumer and is able to deliver (in the case of the beverage delivery system) or to direct the delivery (in the case of the customization interface) the customized beverage to the consumer. Suitable ways of identifying the consumer include, but are not limited to, personal identification number (PIN) either communicated to the system via keypad, touchscreen, matrix card, retinal scanner, thumbprint reader, or radio frequency identification tags (RFID).

The term "consumer identification" as used herein refers to the process in which, and the means by which, the customization director or the ID device recognizes the applicable consumer preferences and is able to develop and determine the appropriate customized beverage accordingly. Suitable ways of identifying the applicable consumer preferences include, but are not limited to, personal identification number (PIN), username, pass code, and the like which can be communicated to the system via an input device or process, such as a keypad, touch screen, matrix card, retinal scanner, thumbprint reader, magnetic card readers, bar codes, or radio frequency identification tags (RFID), and the like.

The term "consumer" as used herein refers to any user of the system interacting with the customization director for the purpose of inputting a beverage option, customization information, customization recommendation, or receiving a beverage product. This individual can be a chef, clerk, customer, "wait staff", servers, etc., and the like. The consumer may access the user interface from a remote location, e.g. by phone, Internet, wireless connection, or the like.

The term "customization information" as used herein the information delivered by the customization interface or the beverage delivery system providing an individualized selection of customized information regarding products, option, characteristic or beverage products that has been processed by the customization interface to be relevant to the individual consumer.

The term "customization recommendation" as used herein is the information determined by the customization director to provide an individualized customized recommendation regarding products, option, characteristic or beverage products that has been processed by the customization director to be relevant to the individual consumer or consumer preference(s). In one embodiment customization recommendations will be based on past interactions. In another embodiment, the customization recommendations may include promotional and/or seasonal selections.

The system of the present invention can also allow individual consumers to communicate with the system so that their personal customized selections can be accommodated by the beverage delivery system. There are many ways that individual systems can be developed to achieve this aspect of the present invention; the examples discussed herein are representative only and are not intended to be limiting. Suitable ways of communicating with the consumer include, but are not limited to, voice, keyboard, Internet, touchscreen, and conventional means such as selectors, slide bars, buttons, and switches. By understanding what individual consumers desire either by certain key questions, sampling or direct taste questions the system can deliver consumers preferred taste and needs.

An individuals' desires can also be dynamic and changing over time and/or by event or experience, e.g. time of day, day of week, day of month, seasonal, occasion, environment, work/pleasure, mood, physical, mental, etc. Their desires can also evolve based on experimentation, experience, education, knowledge, lifestyle changes, and age. The customization interface can include this type of personal or historical information as it processes the consumer information, as well as incorporate demographical trends and traits, and common experiences as it processes consumer information. In another embodiment, the customization recommendation may include promotional and/or seasonal selections.

For example, as individuals age, they may choose to add supplements to their customized beverage (post menopausal women may want to add calcium). Beverage delivery systems in particular venues may offer special additives (e.g., health food stores in health clubs may want to add new product lines (like vitamins or mineral powders) as samples to increase retail sales and health clubs may offer rehydration support after workouts.

Additionally, the customization interface may be continually assimilating available data to increase customization capability and ongoing recommendations. In a particularly prepared embodiment of the system of the present invention, this type of information and inputs are continually monitored, updated, and refined, to changes and predicts options tailored to individual consumers; this aspect of information processing is Global Assimilator Customization System.

In one preferred embodiment of the invention herein, the system uses information around consumer's task preferences to suggest particular retail beverages that the consumer might try. In one version of the aspect, a consumer could use the beverage system to sample various retail brands. Conversely, various retail brands could refer to, or otherwise be associated with, certain flavors or selections in the beverage supply system.

The system of the present invention must be equipped with sufficient and suitable memory function so that both of the consumer and the menu items can be accommodated. This includes product use and incidence and consumer selection and response. There are many ways that individual systems can be developed to accommodate this aspect of the present invention, the examples discussed herein are representative only and are not intended to be limiting. Suitable embodiments of the memory functions of the system of the present invention can include, but are not limited to, central databases, system databases, portable databases.

The system of the present invention can have a means for the customization interface to identify, i.e. recognize, individual consumers. This allows individual consumers to go/return to the physical location(s) of the system(s) (either the customization interface or beverage delivery system) and transmit to the system(s) their desired beverage selection without repeating the step-by-step sequence of selection programming. These individual preferences may also include time and place based adjustments that are determined by past system use histories. There are many ways that individual systems can be developed to accommodate this aspect of the present invention; the examples discussed herein are representative only and are not intended to be limiting. Suitable ways of identifying the consumer include, but are not limited to, personal identification number (PIN) either communicated to the system via a keypad, touchscreen, matrix card, retinal scanner, thumbprint reader, or radio frequency identification tags (RFID). In addition, the system(s) can be pre-programmed, periodically programmed, and/or networked to allow for the individual consumers' identification and associated preferences to be universally recognized by all such systems.

One aspect of the present invention, schematically depicted in FIG. 1, can be understood from the system 100 for delivering a customized beverage product to a consumer, comprising: a user interface 102; a customization director 104 in communication with the user interface 102; a data store 106 in communication with the customization director 104; and a beverage delivery system 109 in communication with the customization director 104. In another embodiment of the present invention, the system further comprises an identification device 108 in communication with the customization director 104 and a consumer identifier 110.

The customization director 104, might comprise a set of executable instructions such as in the form of software, routines, programs, algorithms, code, logic and the like, which would, inter alia, facilitate the determination of customized beverage formulations.

In one embodiment of the present invention, the customization director 104 is provided in communication, such as via a token ring, Ethernet, telephone modem connection, radio or microwave connection, parallel cables, serial cables, telephone lines, universal serial bus "USB", Firewire, Bluetooth, fiber optics, infrared "IR", radio frequency "RF" and the like, or combinations thereof, with the data store 106 and the user interface 102. The customization director 104 may be integrated into a beverage dispensing device, or in an alternatively embodiment might be hosted or housed on a remote device. Remote devices may include other consumer appliances, a personal computer, or an external server located somewhere on the Internet.

In another embodiment of the present invention, the user interface 102 might comprise a computer, a personal digital assistant (PDA), a kiosk, a device with wireless application protocol programs (WAP) such as cell phone, auto computer or PDA, interactive TV, or an Internet appliance, or the like. User interface 102 allows the user to interact with the interactive system 100 and, as will be understood, can take any of a virtually unlimited number of alternative audio, visual and/or other communicative forms. In an exemplary embodiment, the user interface 104 may comprise a computer system comprising a CPU, memory, a visual display device and an input means. Preferred input means comprise a keyboard/keypad or mouse or other means of input such as an input microphone with speech recognition input devices, touch screen input devices, and/or visual input utilizing a video camera. In the illustrated embodiment, the user interface 104 might comprise a computer connected to the Internet through a communication link 120 and running a web browser such as Internet Explorer from Microsoft Corp. or Netscape Navigator from Netscape Communications Corp. An example of the consumer input to be provided by the consumer might comprise the desired temperature of the brewed beverage, for example, hot, warm or cold, or in an alternative embodiment, the input may request an actual temperature to be inputted. Additional areas of input may further include beverage strength (i.e. varying level of blackness), beverage size (i.e. container size), additives such as cream, sugar, milk, artificial sweeteners, flavors and the like.

The beverage delivery system of this example can be a standard beverage delivery system known to one skilled in the art. Examples include single-pass infusion systems, percolation systems, and batch-slurry systems. In one embodiment of the present invention, the interactive system 100 is integrated into the beverage delivery system 109. In another embodiment, the interactive system 100 is separate from the beverage delivery system 109.

In yet another embodiment of the present invention, consumers desiring a customized beverage are provided an identifier 110 such as an identification card, password or number which comprises any available identification device or protocol known to one skilled in the art. Such identification may comprise any combination of bar codes, radio frequency, identification tags, data, chips, smart cards and the like. Various identification/identification device combinations are known to one skilled in the art, and may be employed by various embodiments of the present invention.

In another embodiment of the present invention, the identification device 108 comprises a bar code scanner. Various bar code scanners are known to one skilled in the art and include 1) pen type readers and laser scanners, 2) CCD readers, and 3) camera based readers. Pen type readers include a light source and a photo diode that are placed next to each other in the tip of a pen or wand. To read a bar code, the user passes the tip of the pen across the bars and the photo diode measures the intensity of the light reflected back from the light source and generates a waveform that is used to measure the widths of the bars and spaces in the bar code. Dark bars in the bar code absorb light and white spaces reflect light so that the voltage waveform generated by the photo diode is an exact duplicate of the bar and space pattern in the bar code. This waveform is decoded by the scanner. Laser scanners work the same way as pen type readers except that they use a laser beam as the light source and typically employ either a reciprocating mirror or a rotating prism to scan the laser beam back and forth across the bar code. As with the pen type reader, a photo diode is used to measure the intensity of the light reflected back from the bar code. In both pen readers and laser scanners, the light emitted by the reader is turned to a specific frequency and the photo diode is designed to detect only this same frequency light. Pen type readers and laser scanners can be purchased with different resolutions to enable them to read bar codes of different sizes. The scanner resolution is measured by the size of the dot of light emitted by the reader. CCD (Charge Coupled Device) readers use an array of hundreds of tiny light sensors lined up in a row in the head of the reader. Each sensor can be thought of as a single photo diode that measures the intensity of the light immediately in front of it. Each individual light sensor in the CCD reader is extremely small and because there are hundreds of sensors lined up in a row, a voltage pattern identical to the pattern in a bar code is generated in the reader by sequentially measuring the voltages across each sensor in the row. The important difference between a CCD reader and a pen or laser scanner is that the CCD reader is measuring emitted ambient light from the bar code whereas pen or laser scanners are measuring reflected light of a specific frequency originating from the scanner itself. The newest type of bar code reader currently available are camera based readers that use a small video camera to capture an image of a bar code. The reader then uses sophisticated digital image processing techniques to decode the bar code. Video cameras use the same CCD technology as in a CCD bar code reader except that instead of having a single row of sensors, a video camera has hundreds of rows of sensors arranged in a two dimensional array so that they can generate an image.

In another embodiment of the present invention, the identification device 108 comprises a radio frequency scanning device. Radio Frequency Identification (RF ID) uses radio frequency communication to automatically identify, track and manage objects, people or animals. A low-frequency, passive, magnetically-coupled RF ID system is made up of two parts: a reader and a tag. The tags are typically attached to objects or animals that require a unique identification number. The tags include an electronic circuit (transponder) and tuned antenna-capacitor circuit. The tags are small sophisticated radio transmitters and receivers. They are powered by the RF field generated by the reader. Upon being powered up, the tag will continuously transmit, by damping the incoming RF power field, its data. The RF ID reader has three main functions: energizing, demodulating and decoding. The reader, using a tuned antenna-capacitor circuit, emits a low-frequency radio wave field. This is used to power up the tags. The information sent by the tag must be demodulated. The encoded information is decoded by the reader's on-board micro-controller. This information can then be used by a controlling processor. In both the reader and the tag, the antenna can be shaped and sized in different ways. Because of the small size of the tag, it can be formed to fit almost any situation. Since there is no contact or viewing required, the RF ID system allows great freedom of movement and placement of the tag and reader become less of a critical issue.

In one embodiment of the present invention, an administrative user may access the customization director 104 and data store 106 by utilizing an administrative interface 130 to utilize, analyze or otherwise apply the customization data and consumer feedback data to develop or improve products of the enterprise and to develop or improve components of the beverage brewing system. This insight gained from the consumer may also provide very beneficial information for the research, development, marketing and improvement of future products and systems. It can be contemplated as well, that an enterprise might make its interactive data store results and analysis of the data available to other entities. This might entail allowing such entities to have access to such data via the Internet, via printed reports, via interactive software on computers, periodic data subscription services or the like.

In yet another embodiment of the present invention, the system may further comprise a retail interface 180. The retail interface may be adapted to communicate purchase data and consumer data to and from the customization director 104. For example, a consumer may make a purchase for a beverage at a cashier checkout, but the beverage system may not be directly accessible from the checkout. The retail interface 180 may send data to the customization director 104 which will then prepare the beverage upon interaction by the purchaser. In another embodiment, the retail interface 180 communicates with the customization director 104 to ensure that the consumer is authorized to receive the beverage product. For example, a consumer may purchase the beverage from a remote locale and then enter a special access code at the user interface which then dispenses the beverage to the consumer.

There can be a number of ways to determine relevant customized brewing formulations of the beverage delivery system. In one embodiment, the consumer is prompted to enter consumer preference data through the user interface. This data may then be stored for later retrieval during subsequent visits to the beverage delivery system. As an example, the consumer preference data inputted through the user interface or retrieved from the data store might be matched against one or more decision trees. A decision tree typically comprises a set of responses/traits/categories against which the consumer preference data can be compared against. For example, a decision tree might comprise every combination of possible consumer preference data. The preference data is then compared against the decision tree for a matching branch and the matching branch provides further instructions to be executed as a result of the match. Such decision trees would preferably comprise potential combinations of consumer preference data which have been designed with the system's intended application in mind, so that appropriate optimized operating conditions can be established that pertain to the customized beverage to be delivered. Preferably, the decision trees are converted to mathematical algorithms which then process the decision tree comparisons or "decisions" electronically to quickly ascertain the appropriate optimized beverage formulation for the beverage delivery system.

In order to update the optimization process to allow for modification or "morphing" as appropriate, one embodiment of the present invention comprises the decision trees or algorithms of the customization director 104 being updated by a neural network 111. In the customized beverage delivery example, the neural network 111 would assess various applicable consumer preferences and feedback data retrieved from the data store to determine if any changes to the mathematical algorithms or dialog scripts are needed to facilitate or optimize the decision making process of determining customized beverage formulations. For example, a neural network can continuously update its decision making algorithm by incorporating user input such as feedback into the decision making process akin to artificial intelligence or "smart" logic. According to Haykin, S. (1994), *Neural Networks: A Comprehensive Foundation,* NY; Macmillan, p. 2, a neural network is a massively parallel distributed processor that has a natural propensity for storing experiential knowledge and making it available for use. It resembles the brain in two respects: 1) Knowledge is acquired by the network through a learning process; and 2) Interneuron connection strengths known as synthetic weights are used to store the knowledge. The neural network analyzes the data store 106 for trends, feedback data, consumer preference data and other additional data to develop and refine algorithms for decision making. In one embodiment, a neural network would automatically make changes to the customization director's 104 decision trees or algorithms based upon the growing base of consumer preference and user feedback data. A description of one such suitable neural network can be found in co-pending U.S. Patent Application No. 60/149,857, filed Aug. 19, 1999 in the name of Robert P. Piotrowski et al., which is herein incorporated by reference.

Figure 2:
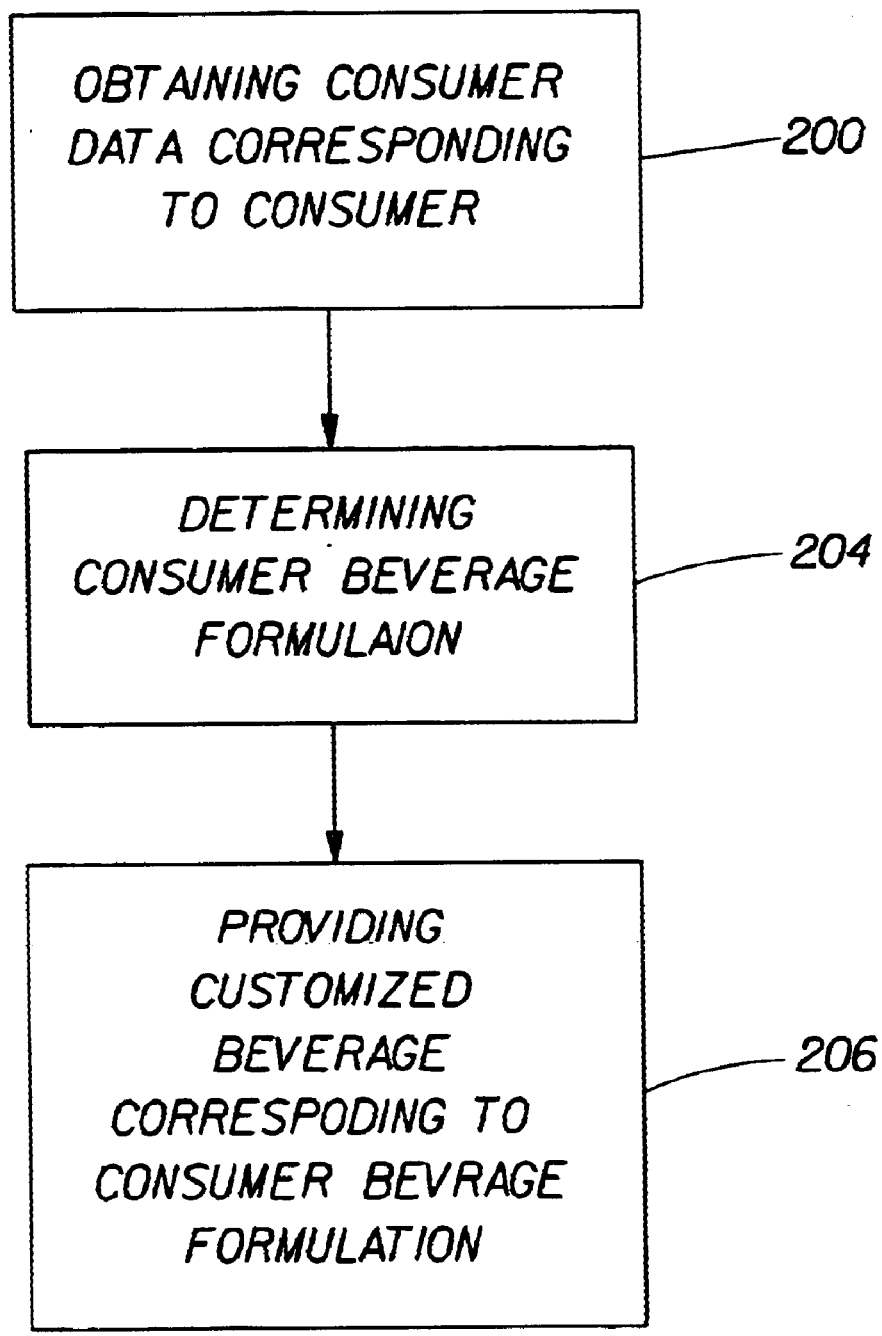
FIG. 2 depicts a flowchart of a method of providing a customized beverage product to a consumer according to the present invention.

Another embodiment of the present invention, depicted in FIG. 2, includes the method for providing a customized beverage product to a customer. The method comprises the steps of obtaining consumer preference data corresponding to a customer (step 200); determining a consumer beverage formulation corresponding to the consumer preference data (step 204); and providing the consumer a customized beverage corresponding to the consumer beverage formulation (step 206).

The system of the present invention can also allow individual customers to communicate with the beverage delivery system so that their customized selections can be accommodated by the beverage delivery system. There are many ways that individual systems can be developed to achieve this aspect of the present invention, the examples discussed herein are representative only and are not intended to be limiting. Suitable ways of communicating with the consumer include, but are not limited to, voice, keyboard, Internet, touchscreen, and conventional means such as selectors, slide bars, buttons, and switches. By understanding what individual consumers desire either by certain key questions, sampling or direct taste questions the system can deliver consumers preferred taste and needs. A customer's desires can also be dynamic and changing over time and/or by event or experience, e.g. time of day, day of week, day of month, seasonal, occasion, environment, work/pleasure, mood, physical, mental, etc. Their desires can also evolve based on experimentation, experience, education, moods, health conditions, knowledge, lifestyle changes, and age. The customization interface can include this type of personal or historical information as it processes the consumer information, as well as incorporate demographic trends and traits, and common experiences as it processes consumer information. Additionally, the customization interface may be continually assimilating available data to increase customization capability and ongoing recommendations. In a particularly prepared embodiment of the system of the present invention, this type of information and inputs are continually monitored, updated, and refined, to changes and predicts options tailored to individual consumers; this aspect of information processing can be accomplished by a neural network or other technologies known to one skilled in the art.

Figure 3:
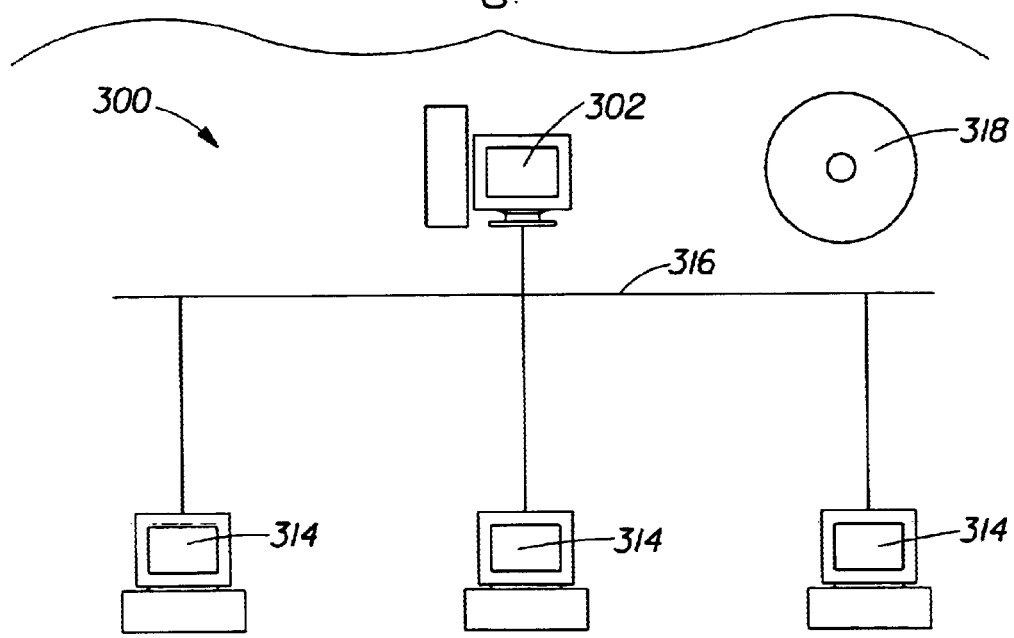
FIG. 3 is a schematic illustration of an exemplary server/client network according to the present invention.

FIG. 3 schematically illustrates a sample client/server network 300 which might be employed to implement an embodiment of the present invention. As one with ordinary skill in the art will readily appreciate, a client/server network is only one type of network, and a variety of other configurations, such as peer-to-peer connections, are also considered networks. In a client/server network, a plurality of nodes are interconnected such that the various nodes send and/or receive information to/from one another. As shown here, a server node 302 is interconnected with a plurality of client nodes 314 using a connection 316 such as a token ring, Ethernet, telephone modem connection, radio or microwave connection, parallel cables, serial cables, telephone lines, universal serial bus "USB", Firewire, Bluetooth, fiber optics, infrared "IR", radio frequency "RF", or other wireless communications, and the like, or combinations thereof.

A computer-readable medium, shown here as a CD ROM (318), holds information readable by a computer, such as programs, data, logic, files, etc. As will be readily appreciated, computer-readable medium can take a variety of forms, including magnetic storage (such as hard disk drives, floppy diskettes, etc.), optical storage (such as laser discs, compact discs, DVD's, etc.), electronic storage (such as random access memory "RAM", read only memory "ROM", programmable read only memory "PROM", etc.), and the like.

Figure 4:
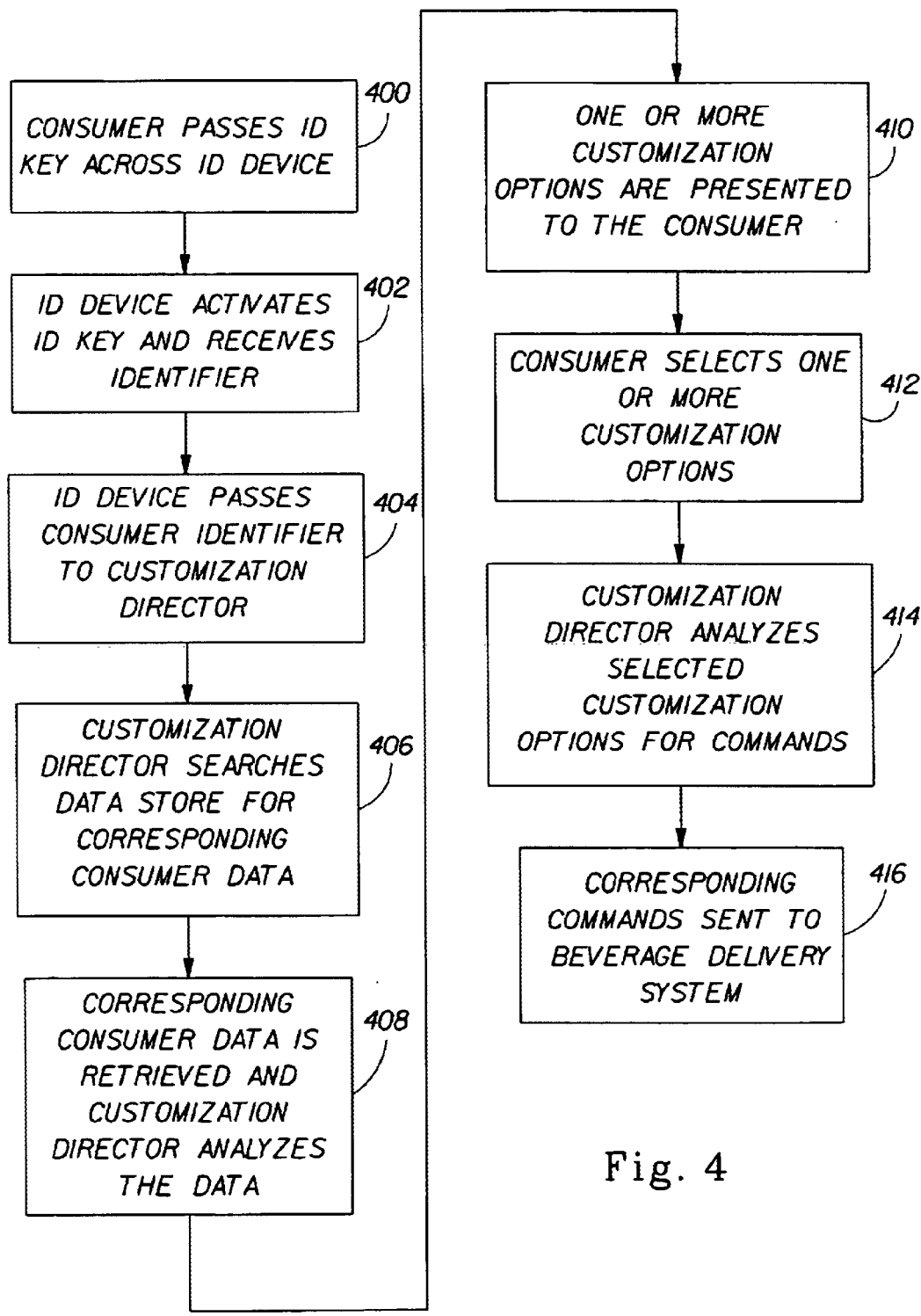
FIG. 4 depicts a flowchart of an exemplary method of providing a customized beverage to a consumer.

One embodiment of the present invention comprises the method for providing a customized beverage product to a consumer. An exemplary embodiment is depicted in the flowchart of FIG. 4. In this example, the consumer has previously registered with the beverage system and has been issued an RF ID key tag to utilize the system. The consumer passes the RF ID key tag across the ID device area of the system (step 400). The ID device activates the RF ID tag and receives the customer identifier stored in the tag (step 402). This customer identifier is then passed to the customization director (step 404), which in turn searches the data store for consumer data corresponding to the consumer identifier (step 406). The consumer data is retrieved and the customization director analyzes the data (step 408) and then presents to the consumer one or more customization options (step 410). In one embodiment, the customization director might also prompt the consumer to enter feedback data for the last interaction and beverage delivery with the system. In another embodiment, the customization director may present one or more promotional and/or seasonal option selections to the consumer. Customization options include but are not limited to strength, flavor, type of bean (coffee), temperature, and finishing options (cream, milk, etc.). The customization director can also display express formulations which enable the consumer to select the express formulation and all other decisions are automatically completed by the system. In one embodiment, the consumer can manually create and save customization options as express formulations to save time and reduce formulation errors for future beverage deliveries. Once the consumer has inputted his/her customization options (step 412), the customization director will analyze the options (step 414) and send corresponding commands to the beverage delivery system (step 416). In addition, the customization director preferably stores the selected customization options in the data store in a record corresponding to the consumer identifier.

In one embodiment, the customization director will, during a later interaction, prompt the consumer to input feedback data corresponding to the previous beverage formulation. For example, the customization director may prompt the consumer to input a rating of 1 to 10 on the beverage product customized during the last visit. In another embodiment, the consumer may select to speak with a customer service representative and the customization director will establish a connection which places the consumer in communication with the customer service person. In yet another embodiment of the present invention, the customization director will display previous beverage purchases associated with the consumer's identification and prompt the consumer to enter feedback data or complete a survey regarding the previous beverage purchases. The consumer may receive a reward (i.e. con, discount, etc.) for complete feedback data.

In another embodiment of the present invention, the consumer can access the user interface to preselect his/her beverage preferences in advance from a remote location. For example, the system may comprise numerous customization formulation options whereby the desired formulations could be customized ahead of actual purchase to save time. In an exemplary embodiment, a web site might be hosted on a network such as a wide-area network, local-area network, or the Internet, and the like, which the consumer can access through some communications device. The web browser contacts a web server and requests data information, in the form of a Uniform Resource Locator (URL). This data information comprises the user interface of the interactive system of the present invention. Typically, URL addresses are typed into the browser to access web pages, and URL addresses are embedded within the pages themselves to provide the hypertext links to other pages. A hypertext link allows the user to click on the link and be redirected to the corresponding web site to the URL address of the hypertext link. Many browsers exist for accessing the World Wide Web, such as Netscape Navigator from Netscape Communications Corp. and the Internet Explorer from Microsoft Corp. Similarly, numerous web servers exist for providing content to the World Wide Web, such as Apache from the Apache Group, Internet Information Server from Microsoft Corp., Lotus Domino Go Webserver from IBM, Netscape Enterprise Server from Netscape Communications Corp. and Oracle Web Application Server from Oracle Corp. These browsers and web servers can be utilized to allow access to the present invention from virtually any web-accessible device.

In another embodiment of the present invention, the system is configured to communicate with a remote data store. This ability allows the customization director to identify individual customers who have not previously interacted with the system at the present location and to retrieve the consumer's centrally-stored profile. This allows individual consumers to go to various physical locations of the system) and transmit to the system their desired beverage selection without repeating the step-by-step sequence of selection programming. These individual preferences may also include time and place based adjustments that are determined by past system use histories. There are many ways that individual systems can be developed to accommodate this aspect of the present invention; the examples discussed herein are representative only and are not intended to be limiting. Suitable ways of identifying the consumer include, but are not limited to, personal identification number (PIN) either communicated to the system via a keypad, touchscreen, matrix card, retinal scanner, thumbprint reader, or radio frequency identification tags (RFID). In addition, the system(s) can be pre-programmed, periodically programmed, and/or networked to allow for the individual consumers' identification and associated preferences to be universally recognized by all such systems.

EXAMPLES

While particular embodiments of the present invention have been illustrated and described, it would be obvious to those skilled in the art that various other changes and modifications can be made without departing from the spirit and scope of the invention.

Example 1

Consumer establishes a personal profile over the Internet or at the system and answers a few simple questions around beverage and related preferences. These questions help deliver the product with the right profile, and may allow the system to make suggestion and/or formulation modifications appropriate for the user during the instant or future transaction. The profile is maintained in a central database accessed by the system via wireless, local area network (LAN) or telephony communication devices wherever the consumer is. The consumer is recognized via a personal identification number (PIN) stored in radio frequency identification tags RFID, matrix cards, or their credit card. Consumer can get their own designed drink or choose from a variety of drinks that are close to their prescribed beverage in personal acceptance.

Consumer is allowed to choose from flavor profile of different attributes in creating their own cup. This is done with slide bars and selectors or a multidimensional space representing the world of beverage taste including strength, sweetness, creaminess, and flavor.

User selects at various times the character of the coffee they prefer via an consumer interface window.

The consumer establishes a personal profile over the Internet or at the system which may entail and answering a few questions about beverage preferences. The response to these questions are analyzed by the customization director to formulate and deliver the product with the right profile. The consumer is presented the opportunity to customize their own beverage or choose from a variety of pre-configured drinks that approximately match the consumer's personal profile.

In one embodiment of the present invention, an administrative user may access the customization director 104 and data store 106 by utilizing an administrative interface 130 to utilize, analyze or otherwise apply the customization data and consumer feedback data to develop or improve products of the enterprise and to develop or improve components of the beverage brewing system. This insight gained from the consumer may also provide very beneficial information for the research, development, marketing and improvement of future products and systems. It can be contemplated as well, that an enterprise might make its interactive data store results and analysis of the data available to other entities. This might entail allowing such entities to have access to such data via the Internet, via printed reports, via interactive software on computers, periodic data subscription services or the like.

In yet another embodiment of the present invention, the system may further comprise a retail interface 180. The retail interface may be adapted to communicate purchase data and consumer data to and from the customization director 104. For example, a consumer may make a purchase for a beverage at a cashier checkout, but the beverage system may not be directly accessible from the checkout. The retail interface 180 may send data to the customization director 104 which will then prepare the beverage upon interaction by the purchaser. In another embodiment, the retail interface 180 communicates with the customization director 104 to ensure that the consumer is authorized to receive the beverage product. For example, a consumer may purchase the beverage from a remote locale and then enter a special access code at the user interface which then dispenses the beverage to the consumer.

Example 2

A.) The extract is prepared by extracting in an industrial coffee extraction column train an all arabica roast and ground coffee. The coffee is extracted such that the end extract is at 30% solids and a 38% extraction yield. The coffee is then cooled and packaged in freezable containers. The containers are then frozen and shipped to various locations.

B.) The coffee extract is then received at the location, still frozen and held in a frozen manner until needed. Sixteen days after brewing, the extract is allowed to warm to 45° F. and then placed in a refrigerated dispenser. The dispenser has a variable dilution system that can dispense the beverage at any strength of coffee from 0.2 to 2.0% brew solids and at dispensed temperature of 50° F. to 190° F. The extract can then be held in the refrigerated dispenser for up to 20 days.

C.) Consumer establishes a personal profile at the system and answers a few simple questions around preference. These questions help customize a product with the right profile. The profile is maintained in a central database accessed by the system via telephone communication devices wherever the consumer is. The consumer is recognized via matrix cards or their credit card. Consumers can get their own designed drink or choose from a variety of drinks that are close to their prescribed customized beverage in personal acceptance.

D.) Products are delivered to the consumer via a system that combines the held extract with water at varying temperatures. The ratio of water to extract controls the resultant strength of the brew. Table of Use History: The coffee extracts were blended together as stated below and then diluted to the designated solids levels. "Time" is the hold time of the extract in the refrigerated dispenser.

| User | Time (Hour) | Dispensed Brew Solids % | Dispensed Temperature ° F. |
|---|---|---|---|
| 1 | 0.75 | 1.0 | 180 |
| 2 | 1.5 | 1.5 | 170 |
| 3 | 4 | 0.67 | 160 |
| 4 | 8 | 0.43 | 185 |
| 5 | 17 | 1.2 | 52 |
| 6 | 23 | 0.92 | 175 |
| 7 | 68 | 0.63 | 165 |
| 8 | 123 | 1.0 | 52 |
| 9 | 245 | 0.63 | 180 |

Example 3

A.) The extract is prepared in a system that extracts Colombian coffee one cup at a time in 60 seconds using a piston and a perforated metal filter mesh screen. The resultant extract can be dispensed "as is" or it can either be diluted and/or used to dissolve an instant Cappuccino powder. The final extract can have variable brew solids and levels of powder.

B.) The coffee extract is used immediately after brewing to develop the desired finished beverage.

C.) Consumer establishes a personal profile over the Internet or at the system and answers a few simple questions around preference. These questions help customize a product with the right profile. The profile is maintained in a central database accessed by the system via wireless, local area network (LAN) or telephony communication devices wherever the consumer is. The consumer is recognized via a personal identification number (PIN) stored in radio frequency identification tags RFID, matrix cards, or their credit card. Consumers can get their own designed drink or choose from a variety of drinks that are close to their prescribed beverage in personal acceptance.

D.) Table of Use History. The coffee extracts were blended together as stated below and then diluted at the designated ratios.

| User | Time (Hour) | Dispensed Brew Solids % | Added amount of Powder |
|---|---|---|---|
| 1 | 0.75 | 0.7 | 15% |
| 2 | 1.5 | 0.4 | 0 |
| 3 | 4 | 0.9 | 20% |
| 4 | 6 | 1.1 | 0 |

Example 4

A.) The extract is prepared by extracting in an industrial coffee extraction column train an all very dark roasted and fine ground all arabica coffee. The coffee is extracted such that the end extract is at 29% solids and a 34% extraction yield and has a exit temperature from the extractor at 86° F. The coffee is then cooled and packaged in containers. The containers are then refrigerated and shipped to various locations.

B.) The coffee extract is then received at the location, still refrigerated and held in a refrigerated manner until needed. Five days after brewing, the extract is placed in a refrigerated dispenser. The dispenser has a variable dilution system that can dispense the beverage at any strength of coffee from 0.2 to 2.0% brew solids and at dispensed temperatures of 50° F. to 190° F. The extract can then be held in the refrigerated dispenser for up to 15 days.

C.) Consumer establishes a personal profile at the system and answers a few simple questions around preference. These questions help customize a product with the right profile. The profile is maintained in a central database accessed by the system via telephone communication devices wherever the consumer is. The consumer is recognized via matrix cards or their credit card. Consumers can get their own designed drink or choose from a variety of drinks that are close to their prescribed beverage in personal acceptance.

D.) Products are delivered to the consumer via a system that combines the held extract with water at varying temperatures. The ratio of water to extract controls the resultant strength of the brew. Table of Use History: The coffee extracts were blended together as stated below and then diluted to the designated solids levels. "Time" is the hold time of the extract in the refrigerated dispenser.

| User | Time (Hour) | Dispensed Brew Solids % | Dispensed Temperature ° F. |
|---|---|---|---|
| 1 | 4 | 0.92 | 180 |
| 2 | 6 | 0.63 | 170 |
| 3 | 12 | 0.87 | 160 |
| 4 | 33 | 0.43 | 185 |
| 5 | 52 | 1.2 | 52 |
| 6 | 63 | 0.92 | 175 |
| 7 | 89 | 0.63 | 185 |
| 8 | 123 | 0.92 | 52 |
| 9 | 56 | 0.63 | 180 |

Example 5

A) The extract from Example 1 and the extract from Example 3 are extracted as described and then separately packaged and frozen and shipped.

B) The coffee extracts are then received at the location, still frozen and held in a frozen manner until needed. Ten days after brewing, the extracts are allowed to warm to 45° F. and then placed in a refrigerated dispenser. The two fractions can be blended together at any ratio and also diluted with water. The extract can then be held in the refrigerated dispenser for up to 20 days.

C) Consumer selects at various times the character of the coffee they prefer via an consumer interface window.

D) Table of Use History. The coffee extracts were blended together as stated below and then diluted to the designated brew solids. "Time" is the hold time of the extracts in the refrigerated dispenser.

| User | Time (Hour) | Extract 1 | Extract 2 | Final Brew Solids % |
|---|---|---|---|---|
| 1 | 2 | 50% | 50% | 0.8 |
| 2 | 6 | 40% | 60% | 0.6 |
| 3 | 24 | 100% | 0% | 1.3 |
| 4 | 96 | 25% | 75% | 1.1 |

Example 6

A.) The coffee is prepared by placing 35 grams of roast and ground coffee in a standard brew basket of a ½ gallon bottle brewer. 1800 milliliters of water is delivered to the brew basket at 200° F. and 12 milliliters per second and atmospheric pressure. The brew is filtered with standard paper coffee filters. During extraction, the first half of the extract is diverted to one holding chamber resulting in a 0.6% brew solids and a 12% brew solids yield. The last half of the brew, a resultant extract of 0.4% brew solids and 10% yield, is collected in a second chamber.

B.) The two fractions are held in a insulated vessel until dispensed. The two fractions can be blended together at any ratio and also diluted with water.

C.) Consumer establishes a personal profile over the Internet or at the system and answers a few simple questions around preference. These questions help customize a product with the right profile. The profile is maintained in a central database accessed by the system via wireless, local area network (LAN) or telephony communication devices wherever the consumer is. The consumer is recognized via a personal identification number (PIN) stored in radio frequency identification tags RFID, matrix cards, or their credit card. Consumers can get their own designed drink or choose from a variety of drinks that are close to their prescribed beverage in personal acceptance.

A) Table of Use History. The coffee extracts were blended together as stated below and then diluted at the designated ratios.

| User | Time (Hour) | Extract 1 | Extract 2 | Water to Extract Ratio |
|---|---|---|---|---|
| 1 | 0.3 | 50% | 50% | 0:1 |
| 2 | 0.5 | 40% | 60% | 1:1 |
| 3 | 06 | 100% | 0% | 0.5:1 |
| 4 | 0.8 | 25% | 75% | 0.2:1 |

Example 7

A.) The coffee is prepared by placing 90 grams of all roast and ground coffee in a standard brew basket/funnel of a 1½ gallon satellite brewer. 4500 milliliters of water is delivered to the brew basket at atmospheric pressure. Water is delivered at 200° F. and 10 milliliters per second. The brew is filtered with standard paper coffee filters. This brew is fractionated into five equal volumes over the length of the brew.

B.) The fractions are held for up to 2 hours on a Bunn Softheat™ satellite system at 180° F.

C.) Consumer selects at various times the character of the coffee they prefer via an consumer interface window.

D.) Table of Use History. Coffee fractions were blended together as stated below and then diluted at the designated ratios.

| User | Time (Hour) | Fraction 1 | Fraction 2 | Fraction 3 | Fraction 4 | Fraction 5 | Water to Extract Ratio |
|---|---|---|---|---|---|---|---|
| 1 | 0.3 | 0 | 65% | 0 | 0 | 35% | 0:1 |
| 2 | 0.4 | 15% | 35% | 0 | 40% | 10% | 1:1 |
| 3 | 0.5 | 55% | 15% | 0 | 0 | 30% | 0.2:1 |
| 4 | 0.6 | 70% | 0 | 30% | 0 | 0 | 0:1 |
| 5 | 0.65 | 15% | 35% | 0 | 40% | 10% | 1:1 |
| 6 | 0.7 | 0 | 100% | 0 | 0 | 0 | 0.2:1 |
| 7 | 1.2 | 15% | 15% | 15% | 25% | 30% | 0:1 |
| 8 | 1.3 | 100% | 0 | 0 | 0 | 0 | 1:1 |
| 9 | 1.5 | 15% | 30% | 15% | 25% | 15% | 0.7:1 |

Example 8

A.) Using an all arabica and robusta blend of roast and ground coffees, the extract is prepared by cold extraction at 45° F. in a batch mode without agitation. At 16 hours the extract reaches steady brew solids level of 13%.

B.) The slurried coffee and extract is then maintained in the vessel at 45° F. for up to 20 days. When needed, the extract is filtered through a synthetic mesh filter at the bottom of the vessel.

C.) User selects at various times the character of the coffee they prefer via an consumer interface window.

D.) Products are delivered to the consumer via a system that combines the held extract with water at varying temperatures. The ratio of water to extract controls the resultant strength of the brew. Table of Use History: "Time" designates the age of the extract since the start of brewing.

| User | Time (Hour) | Dispensed Brew Solids % | Dispensed Temperature ° F. |
|---|---|---|---|
| 1 | 20 | 1.0 | 180 |
| 2 | 22 | 0.6 | 170 |
| 3 | 24 | 0.5 | 180 |
| 4 | 56 | 0.4 | 170 |
| 5 | 82 | 1.0 | 180 |
| 6 | 123 | 0.5 | 170 |
| 7 | 124 | 0.4 | 180 |
| 8 | 166 | 0.6 | 170 |

Example 9

In this example, an exemplary interaction with the customization director will be described. The consumer, Frank, approaches the user interface and slides his beverage card through the card reader which is part of the user interface. Frank previously had completed an application for the beverage card and was subsequently sent his own beverage card. Frank's beverage card contains a unique identification number that is utilized by the customization director to retrieve Frank's profile. In this example, Frank had previously chosen a password/passnumber to protect unauthorized use of his beverage card. Upon swiping his card through the card reader, the customization director through the user interface prompts Frank to input his password. Frank inputs his password through the touch screen display of the user interface. The customization director transmits the identification number and password to the data store to determine if they matched an existing record. Finding a match, the customization director retrieves Franks customization profile and analyzes the profile to determine the beverage options to display to Frank. The customization director displays numerous customization options to Frank such as coffee been type, temperature, strength, finishing options as well as a few express options such as your last coffee purchase, store's special pick and beverage of the month. Frank then inputs the selection of the special of the month. The customization director receives Frank's selection and determines the corresponding commands to send to the beverage delivery system. The beverage delivery system receives the commands and delivers the selected beverage to Frank. The customization director records Frank's beverage purchase in the data store.

Example 10

In this example, another exemplary interaction with the customization director will be described. A typical consumer, Alice, approaches the user interface to customize a beverage purchase. Alice has never used the customization system before and has not pre-registered her preferences. The user interface prompts Alice to enter her user ID number or select "NEW" if the consumer is new. Alice selects "NEW" on the touch screen of the user interface. The customization director receives the "NEW" selection and determines which selection options to present to Alice. The customization director presents various customization options to Alice through the user interface. Some of the options include express recommendations, formulation options and a registration option. The registration option contains various input areas for the consumer to enter his/her preference data. The customization director than creates a new record for the consumer in the data store and associates the record with a new user identification (number, password, and the like). This new identification is then displayed to the user and preferably is sent to the user through an additional means. In this example, Alice chooses the formulation options and is asked to select the type of bean. Alice selects her desired bean type and then is prompted by the customization director to enter the desired temperature range of the beverage. Alice then selects some finishing options such as addition of cream and sugar to the formulation. The customization director then determines the corresponding commands for the beverage delivery system to produce the customized beverage. The customization director sends the commands to the beverage delivery system and records the customized formulation in the data store. The beverage delivery system receives the commands and produces the customized beverage for Alice.

System for making and delivering a customized beverage product to a consumer having a user interface, a customization director in communication with a customization data store and the user interface, wherein the customization director includes executable instructions for determining a user's customized formulation; and a beverage delivery system in communication with the customization director, wherein the beverage delivery system includes executable instructions for delivering a customized beverage product. Method for delivering a customized beverage product to an individual including the steps of obtaining consumer preference data; determining a consumer beverage formulation corresponding to the consumer preference data; and providing the consumer a customized beverage corresponding to the customized beverage formulation.

What is claimed is:

1. A method for delivering an individually customized beverage product to an individual consumer, said method comprising the steps of:
   a) a customization interface (consumer interface) obtaining consumer preference data;
   b) said customization interface processes said consumer preference data;
   c) said customization interface communicates with a beverage delivery system;
   d) said beverage delivery system delivers an individually customized beverage, based upon the consumer preference data processed by the customization interface, wherein the beverage delivery system performs one or more of the following steps, in any order:
      1) customizing the dilution of the beverage extract based upon the consumer preference data, and delaying the dilution of the beverage extract for a minimum period of about 5 minutes after the onset of brewing of the extract;
      2) customizing the mixing of the beverage extract based upon the consumer preference data, and delaying the mixing of the beverage extract for a minimum period of about 5 minutes after the onset of brewing of the extract; and
      3) customizing the filtering of the beverage extract based upon an individual consumer's preferences, and delaying the filtering of the beverage extract for a minimum period of about 5 minutes after the onset of brewing of the extract.

2. A method for delivering an individually customized beverage product to an individual consumer, said method comprising the steps of:
   a) a customization interface (consumer interface) obtaining consumer preference data regarding said consumer's preferences;

b) said customization interface processes said consumer preference data;

c) said customization interface communicates with the consumer to provide an individually customized recommendation to be utilized by the consumer in selecting a suitable beverage operation from the beverage delivery system;

wherein the beverage delivery system performs one or more of the following steps, in any order:

1) customizing the dilution of the beverage extract based upon the consumer preference data, and delaying the dilution of the beverage extract for a minimum period of about 5 minutes after the onset of brewing of the extract;
2) customizing the mixing of the beverage extract based upon the consumer preference data, and delaying the mixing of the beverage extract for a minimum period of about 5 minutes after the onset of brewing of the extract;
3) customizing the filtering of the beverage extract based upon the consumer preference data, and delaying the filtering of the beverage extract for a minimum period of about 5 minutes after the onset of brewing of the extract.

3. The method of claim 2 wherein the consumer inputs said recommendation to the beverage delivery system.

4. The method of claim 2 wherein a customized beverage is delivered by the beverage delivery system.

5. A method for delivering an individually customized beverage product to an individual consumer, said method comprising the steps of:

a) a customization interface (consumer interface) obtaining consumer preference data regarding said consumer's preferences;

b) said customization interface processes said consumer preference data;

c) said customization interface communicates with the consumer to prove an individually customized selection identification to be utilized by the consumer in selecting a suitable beverage option from the beverage delivery system wherein the beverage delivery system performs one or more of the following steps, in any order:

1) customizing the dilution of the beverage extract based upon the consumer preference data, and delaying the dilution of the beverage extract for a minimum period of about 5 minutes after the onset of brewing of the extract;
2) customizing the mixing of the beverage extract based upon the consumer preference data, and delaying the mixing of the beverage extract for a minimum period of about 5 minutes after the onset of brewing of the extract;
3) customizing the filtering of the beverage extract based upon the consumer preference data, and delaying the filtering of the beverage extract for a minimum period of about 5 minutes after the onset of brewing of the extract.

6. The method of claim 5 wherein the consumer inputs said identification to the beverage delivery system.

7. The method of claim 6 wherein a customized beverage is delivered by the beverage delivery system.

8. A method for delivering an individually customized information related to beverage product options to an individual consumer, said method comprising the steps of:

a) a customization interface (consumer interface) obtaining consumer preference data regarding said consumer's preferences;

b) said customization interface processes said consumer preference data;

c) said customization interface provides customization information to the individual consumer;

wherein the beverage delivery system performs one or more of the following steps, in any order:

1) customizing the dilution of the beverage extract based upon the consumer preference data, and delaying the dilution of the beverage extract for a minimum period of about 5 minutes after the onset of brewing of the extract;
2) customizing the mixing of the beverage extract based upon the consumer preference data, and delaying the mixing of the beverage extract for a minimum period of about 5 minutes after the onset of brewing of the extract;
3) customizing the filtering of the beverage extract based upon the consumer preference data, and delaying the filtering of the beverage extract for a minimum period of about 5 minutes after the onset of brewing of the extract.

9. A method for delivering an individually customized recommendation for beverage product options to an individual consumer, said method comprising the steps of:

a) a customization interface (consumer interface) obtaining consumer preference data regarding said consumer's preferences;

b) said customization interface processes said consumer preference data;

c) said customization interface delivers the individually customized recommendation to the consumer to be utilized by the consumer in selecting a suitable beverage option from the beverage delivery system;

wherein the beverage delivery system performs one or more of the following steps, in any order:

1) customizing the dilution of the beverage extract based upon the consumer preference data, and delaying the dilution of the beverage extract for a minimum period of about 5 minutes after the onset of brewing of the extract;
2) customizing the mixing of the beverage extract based upon the consumer preference data, and delaying the mixing of the beverage extract for a minimum period of about 5 minutes after the onset of brewing of the extract;
3) customizing the filtering of the beverage extract based upon the consumer preference data, and delaying the filtering of the beverage extract for a minimum period of about 5 minutes after the onset of brewing of the extract.

10. The method of claim 9 wherein the consumer inputs said recommendation to the beverage supply system.

11. The method of claim 10 wherein a customized beverage is delivered by the beverage supply system.

12. A method for delivering an individually customized selection identification regarding beverage product options to an individual consumer, said method comprising the steps of:

a) a customization interface (consumer interface) obtaining customer preference data regarding said consumer's preferences;

b) said customization interface processes said customer preference data;

c) said customization interface communicates with the consumer to prove an individually customized selection identification to be utilized by the consumer in selecting a suitable beverage option from the beverage delivery system;

wherein the beverage delivery system performs one or more of the following steps, in any order:

1) customizing the dilution of the beverage extract based upon the consumer preference data, and delaying the dilution of the beverage extract for a minimum period of about 5 minutes after the onset of brewing of the extract;
2) customizing the mixing of the beverage extract based upon the consumer preference data, and delaying the mixing of the beverage extract for a minimum period of about 5 minutes after the onset of brewing of the extract;
3) customizing the filtering of the beverage extract based upon the consumer preference data, and delaying the filtering of the beverage extract for a minimum period of about 5 minutes after the onset of brewing of the extract.

13. The method of claim 12 wherein the consumer inputs said identification to the beverage delivery system.

14. The method of claim 13 wherein a customized beverage is delivered by the beverage delivery system.

15. The method of claim 12 wherein the consumer is given an identification mechanism for future use with a beverage delivery system.

16. The method of claim 1 wherein the customization interface utilizes a Global Assimilation Customization Systems.

17. The method of claim 8 wherein the customization interface utilizes a Global Assimilation Customization Systems.

18. The method of claim 9 wherein the customization interface utilizes a Global Assimilation Customization Systems.

19. The method of claim 12 wherein the customization interface utilizes a Global Assimilation Customization Systems.

* * * * *